United States Patent

Miyawaki et al.

[11] Patent Number: 5,841,516
[45] Date of Patent: Nov. 24, 1998

[54] PHOTOGRAPHIC PROCESSING APPARATUS

[75] Inventors: Hiroshi Miyawaki; Keiji Morimoto; Takahisa Miyamori; Shinji Azuma, all of Wakayama; Mitsuhiko Itojima, Wakayama-ken, all of Japan

[73] Assignee: Noritsu Koki Co., Ltd., Wakayama, Japan

[21] Appl. No.: 825,283

[22] Filed: Mar. 27, 1997

Related U.S. Application Data

[63] Continuation-in-part of Ser. No. 418,983, Apr. 7, 1995, Pat. No. 5,655,252.

[30] Foreign Application Priority Data

Apr. 1, 1996 [JP] Japan .................................. 8-078771

[51] Int. Cl.$^6$ .............................. G03B 27/52; B08B 11/02
[52] U.S. Cl. .............................. 355/30; 355/40; 396/319; 15/100
[58] Field of Search .................................. 355/30, 40, 18; 352/130; 15/100, 256.53, 308, 309.1; 360/3; 396/319

[56] References Cited

U.S. PATENT DOCUMENTS

| | | | |
|---|---|---|---|
| 582,509 | 5/1897 | Seufert . | |
| 1,689,497 | 10/1928 | Morgal | 15/380 |
| 2,171,631 | 9/1939 | Moncreiff et al. | 15/88.1 |
| 2,524,928 | 10/1950 | Platz | 15/380 |
| 3,139,975 | 7/1964 | Schaefer | 15/380 |
| 3,398,022 | 8/1968 | Maust | 15/308 |
| 4,378,610 | 4/1983 | Ermer et al. | 15/100 |
| 4,706,325 | 11/1987 | Michelson | 15/308 |
| 5,101,225 | 3/1992 | Wash et al. | 355/40 |
| 5,286,303 | 2/1994 | Avelis | 15/308 |
| 5,600,498 | 2/1997 | Motooka et al. | 360/3 |
| 5,612,796 | 3/1997 | DeCook et al. | 355/36 |
| 5,614,986 | 3/1997 | Yoshikawa et al. | 355/18 |

*Primary Examiner*—A. A. Mathews
*Attorney, Agent, or Firm*—Fulbright & Jaworski, LLP

[57] ABSTRACT

The present invention relates to a photographic processing apparatus including a construction for cleaning a magnetic recording portion of a photographic film having such magnetic recording portion. The apparatus includes a transporting mechanism for transporting the film along a film transport passage, a magnetic head for recording magnetic information recorded in the magnetic recording portion, and a stationary head disposed upstream in the film transport passage for cleaning the magnetic recording portion of the film.

13 Claims, 18 Drawing Sheets

FIG. 25
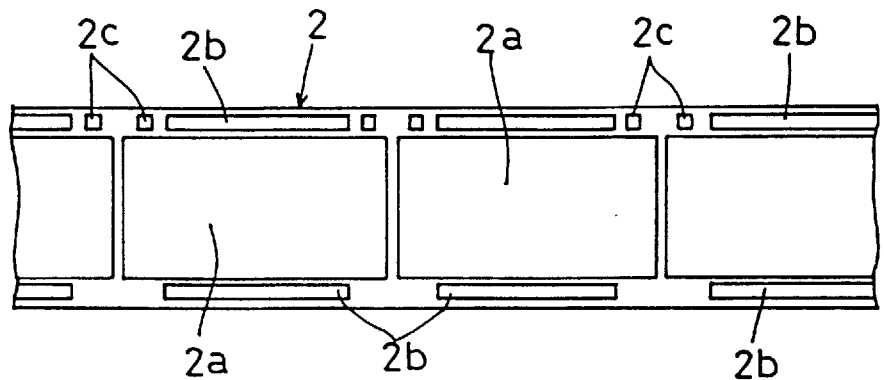
FIG. 26
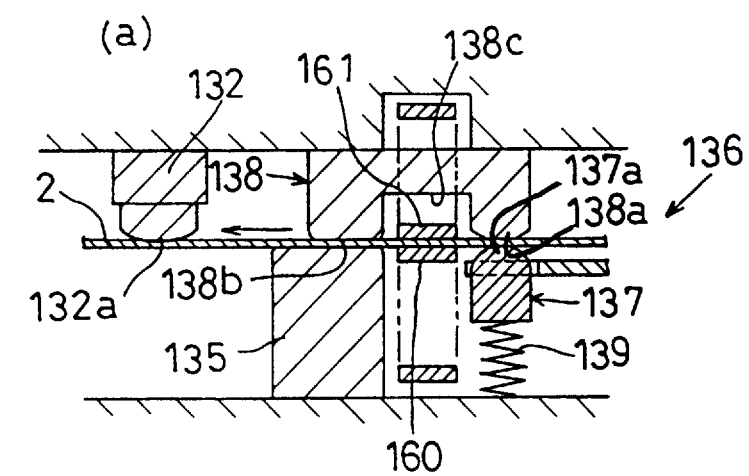
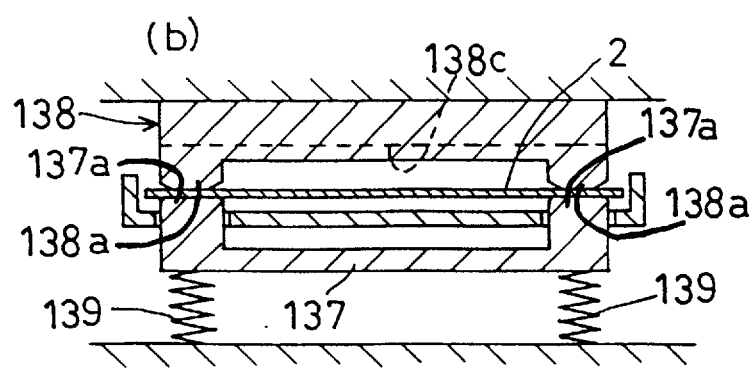

PHOTOGRAPHIC PROCESSING APPARATUS

This application is a continuation-in-part of U.S. application Ser. No. 08/418,983 filed Apr. 7, 1995, now U.S. Pat. No. 5,655,252.

BACKGROUND OF THE INVENTION

1. Field of the Invention

The present invention relates to a photographic processing apparatus including a magentic head for processing magentic information recorded in a magnetic recording portion of a photographic film.

2. Description of the Related Art

There is known a photographic film including, in addition to a photographic image recording portion, a magentic recording portion from or to which various information is read or written. The recording, i.e. writing operation to the magentic recording portion is done e.g. at the time of photography by means of a magentic head incorporated in the camera, in order to record various kinds of information such as exposure conditions including an exposure time, an aperture value, or use/non-use of a flash, a date of photography, a printing size and so on. The art of writing and writing such information to and from the magentic recording portion by using a magentic head is known from e.g. Japanese laid-open patent gazette Hei. 7-29130.

Incidentally, for accuracy in the writing or reading operation by the magentic head, it is necessary to remove dust or any other foreign substance adhered to the film surface. Especially, in the case of a developed photographic film, in addition to such ordinary dust or substance, it is also necessary to remove excess developing liquid coagulated on the film surface. For, if such coagulated developing liquid is inadvertently detached from the film surface and entrapped within a gap portion of the magnetic head, accurate reading or writing operation may become impossible.

In an attempt to overcome the above problem, there has been proposed a magnetic head device as disclosed in the Japanese laid-open patent gazette Hei. 7-134849. In this device, the gap portion of the magentic head is spring-urged via a pad so as to restrict deposition of dust at this portion.

With the above-described conventional art, however, although the provision is made for restricting deposition of dust at the gap portion of the magnetic head, this cannot completely remove dust adhered to the magnetic head. Namely, as described in column 3, lines 47 through 50 of the above-identified gazette, it is always necessary to 'scrape off any dust adhered to the magentic head by means of cleaning polishing agent applied to the surface of the photographic film." Hence, this convential construction does not inhibit adhesion of dust to other portions of the magnetic head than the gap portion. In this respect, the conventional construction has not provided satisfactory anti-dust measure.

SUMMARY OF THE INVENTION

An object of the present invention is to provide a photographic processing apparatus which is capable of preventing adhesion or dust to a magnetic head.

Another object of the present invention is to improve the accuracy in information reading or writing operation by the magnetic head.

For accomplishing the above-noted object, a photographic processing apparatus for processing a photographic film based on magentic information recorded in a magentic recording portion of the film, comprises;

transporting means for transportxing the photographic film along a film transport passage in a film transporting direction;

a magnetic head disposed in the film transport passage; and first cleaning means disposed upstream relative to the magnetic head in the film transport passage for cleaning the magentic recording portion of the film.

With the above-described construction, dust or any other foreign substance such as coagulated developing liquid adhered to the magentic recording portion of the film is removed by the first cleaning means disposed on the upstream side relative to the magnetic head in the film transport passage. That is, the photographic file is cleaned before the information reading or writing operation by the magnetic head. Then, it has become possible to significantly reduce adhesion or dust or developing liquid or the like to the magnetic head, in comparison with the conventional construction. As a result, the information reading or writing operation by the magnetic head may be effected with higher accuracy. Further, if the cleaning polishing agent is also used, it is possible to reduce the frequency of its use. Preferably, the first cleaning means includes a stationary head member and a movable head member which members are disposed across the film surface, with the movable head member being elastically urged against the stationary head member. More preferably, the stationary head member is disposed on the side of the magnetic recording portion of the film.

With the above construction, the photographic film may be supported reliably between the pair of head members, thus removing the dust or coagulated developing liquid from the film surface in a reliable manner. Further, if the stationary head member rather than the movable head member is disposed on the side of the magnetic recording portion, the dust removing efficiency may be improved.

Preferably, the apparatus further comprises second cleaning means interposed between the magnetic head and the first cleaning means in the film transport passage for cleaning an image recording portion of the film.

With the above, in addition to the magentic recording portion, the image recording portion of the film also may be cleaned. Moreover, it becomes also possible to utilize the second cleaning means for carrying the dust or the like removed by the first cleaning means away to a distant location.

Incidentally, the photographic processing apparatus of the invention may include either one of a magnetic reading head or magnetic writing head or both of these. Further, in case the apparatus includes both of the reading and writing heads, these heads may be provided separately or as one integrated head. If the apparatus separately includes the reading head and the writing head, it is preferred that these magnetic writing head and magnetic reading head be interposed between a pair of first cleaning means. With this, the film may be cleaned prior to the readiog!os!writing operation by the respective heads, Further, in the case of the apparatus including the second cleaning means also, it is preferred that the magnetic wriring head and the magnetic reading head be interposed between a pair of second cleaning means. With this, the second cleaning means cleans the film surface over the entire width thereof including the image recording portion. As a result, subsequent processing operations such as a printing operation or reading operation of the image may be effected properly, and also the reading or writing operation by the magnetic heads may be effected with still higher accuracy and reliability.

Further and other objects, features and effects of the invention will become more apparent from the following more detailed description of the embodiments of the invention with reference to the accompanying drawings.

BRIEF DESCRIPTION OF THE DRAWINGS

FIG. 25 is a view showing magnetic recording portions of a film, FIGS. 26(a) and (b) are schematic views of a cleaning head.

DETAILED DESCRIPTION OF THE PREFERRED EMBODIMENTS

A first preferred embodiment of the invention relating to a dust removing apparatus incorporated in an image printer system, will be described next.

Figure 1:
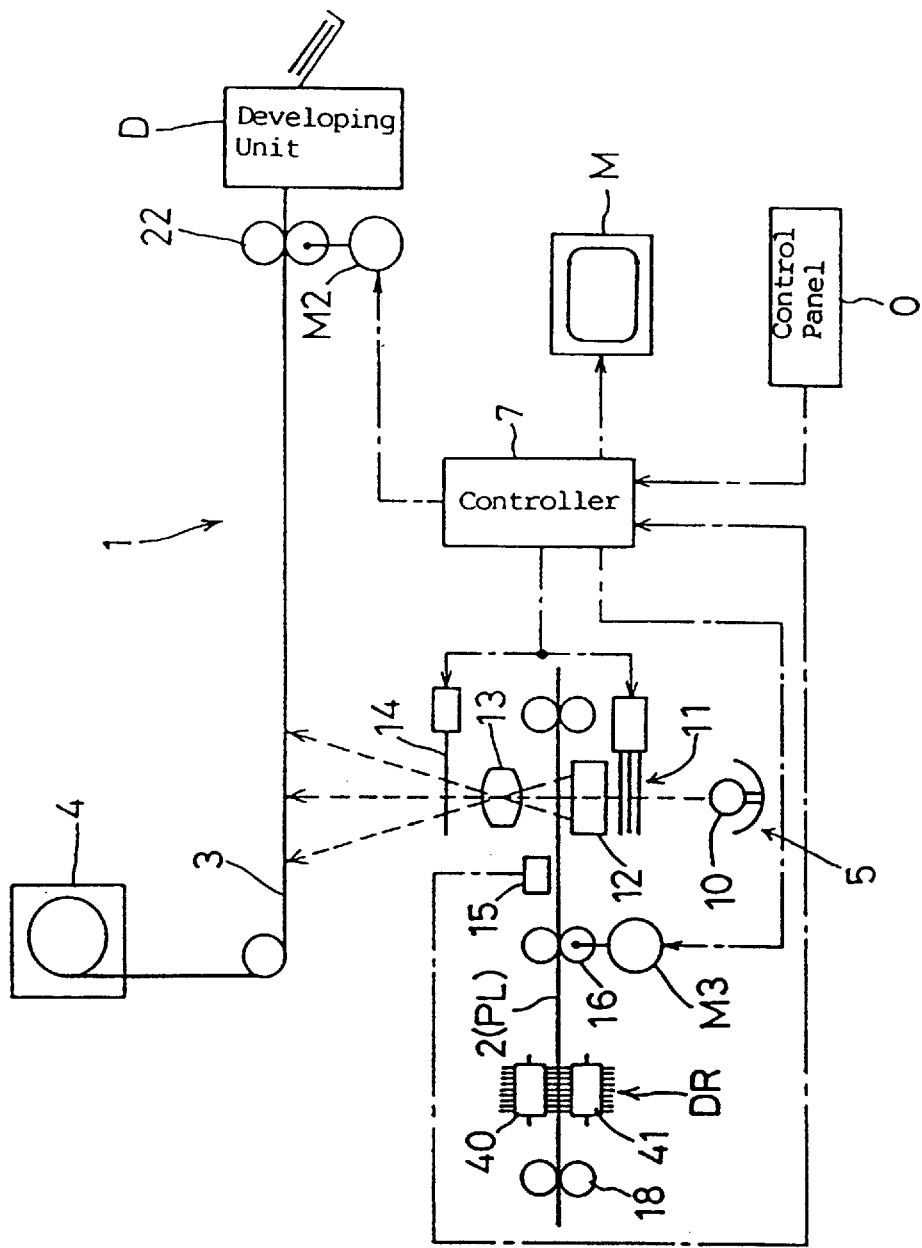
FIG. 1 is a schematic construction view relating to a first embodiment of the present invention.

As shown in FIG. 1, an image printer system 1 includes a projection exposure section 6 for projecting and exposing onto a print paper 3 an image of a sheet-like photographic photosensitive material PL such as a photographic film 2, and a developing section D for developing the exposed print paper 3.

The print paper 3 withdrawn from a print-paper magazine 4 in which the paper 3 is stored in a convoluted state, is exposed at the projection exposure section 5 and then developed at the developing section D. Thereafter, the print paper is cut into segments each containing one-frame amount of image information and discharged from the system.

Next, the respective components listed above will be described.

The projection exposure section 5 includes a projection exposure light source 10, a light modulating filter 11 for adjusting color balance of the light beam to be irradiated onto the photographic film 2, a mirror tunnel 12 for uniformly mixing the light passing through the light modulating filter 11, a printing lens 13 for imaging the image information of the photographic film 2 on the print paper 3 and a shutter 14, with all the above elements being disposed on a common optical axis.

On the upstream side of the projection exposure section 5 in a transport passage of the photographic film 2, there is provided an image sensor 15 for reading the image information of the photographic film 2 in the form of a plurality of discrete areas. Referring more particularly to the function of the image sensor 15, a white light beam is irradiated on the photographic film 2 and the intensity of its reflected or transmission light is measured by means of e.g. a CCD line sensor or a CCD image sensor with the light being separated into the three primary color components of red, green and blue. The image information read by the image sensor 15 is then transmitted to a controller 7 to be used for obtaining exposure conditions at the projection exposure section 5 and also the controller produces and presents a simulated image on a monitor M, which simulated image would result from the read image information if exposed on the print paper 3 under the obtained exposure conditions.

On the upstream side of the image sensor 15 in the transport passage of the photographic film 2, there are provided rollers 16, 18 for feeding the photographic film 2 to the projection exposure section 5 and a motor M3 for rotatably driving the rollers 16, 18.

Between the rollers 16, 18 in the transport passage of the photographic film 2, there is provided a dust removing apparatus DR for the photographic film 2. Front and back surfaces of the photographic film 2 comprise dusty material surfaces 2a to be treated by the dust removing apparatus.

Figure 2:
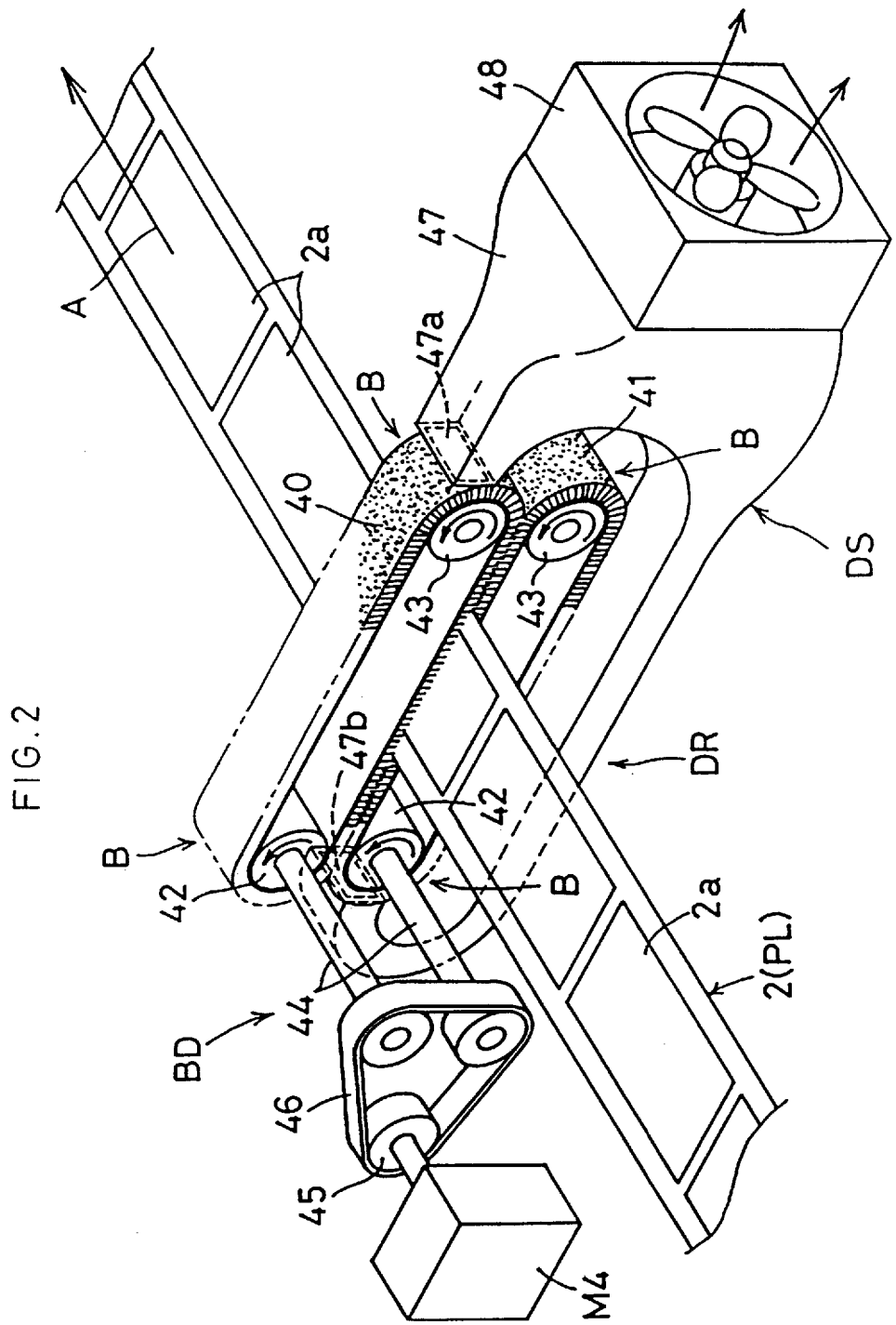
FIG. 2 is a perspective view of major portions relating to the first embodiment of the present invent ion.

The dust removing apparatus DR, as shown in FIG. 2, includes upper and lower brush belts 40, 41 as first and second dust removing members respectively of dust removing means in the form of endless belts disposed upwardly and downwardly of the transport passage of the photographic film 2, a suction means DS, as dust take-off means, for sucking dust adhered to the upper and lower brush belts 40, 41 and a drive means BD for rotatably driving the upper and lower brush belts 40, 41. The suction means DS functions as a dust take-off member DE.

The drive means BD includes drive rollers 42 and driven rollers 43 around which the brush belts 40, 41 are entrained, connector shafts 44 connected with the drive rollers 42, a motor M4 for rotatably driving the brush belts 40, 41, and a transmission belt 46 entrained around a motor roller 45 mounted at a leading end of a rotary shaft of the motor M4 and also leading ends of the two connector shafts 44 for transmitting the drive force of the motor H4. Then, in operation, the brush belts 40, 41 are driven to rotate counterclockwise as viewed from the transport direction of the photographic film 2.

The suction means DS includes an air duct 47 having openings 47a, 47b respectively at a position adjacent the driven roller 43 about which the upper brush roller 40 is entrained and a further position adjacent the drive roller 42 about which the lower brush belt 41 is entrained, and also a fan 48 communicated with the air duct 47. The fan 48 is rotated in a direction for withdrawing the dust from the brush belts 40, 41 through the openings 47a, 47b.

Figure 3:
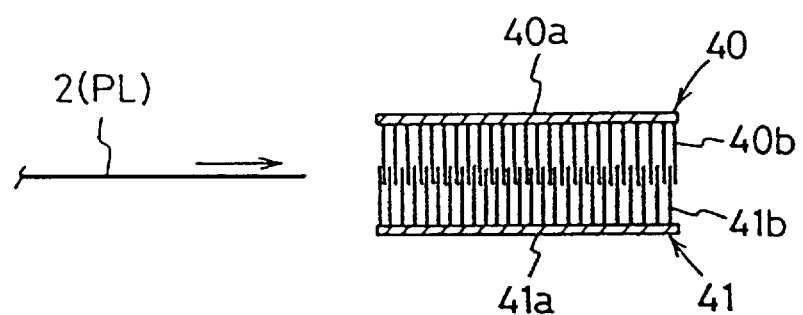
FIG. 3 is an enlarged view of the major portions relating to the first embodiment.

As shown in FIG. 3, the brush belts 40, 41 include bristles 40a, 41b on the side thereof contacting the photographic film 2. Where the upper brush belt 40 and the lower brush belt 41 face each other, the leading ends of the upper and lower bristles 40b, 41b extend with an overlap therebetween.

The photographic film 2 is forcibly transported through the overlapping bristles 40b, 41b, so that the upper and lower brush belts 40, 41 come into contact with the front and back surfaces of the photographic film 2 respectively.

Further, the brush belts 40, 41 are entrained about the drive and driven rollers 42, 43 so that the belts are driven to run at 90 degrees transversely relative to the transport direction of the photographic film 2 denoted by an arrow A in FIG. 2.

Since both the upper brush belt 40 and the lower brush belt 41 are rotated counterclockwise as viewed from the transport direction of the photographic film 2. a pair of contact portions of the belts 40, 41 contacting the photographic film 2 are driven in opposite directions to each other at one location on the transport direction of the photographic film 2.

The drive rollers 42 and the driven rollers 43 are disposed away from each other on the left and right sides of the photographic film 2, so that curved portions B of the belts 40, 41 formed by the presence of the drive and driven rollers 42, 43 too are disposed away from the photographic film 2.

The openings 47a, 47b of the air duct 47 of the suction means DS are disposed to face the first one of the curved portions B to which the belts first come into opposition after the contact with the photographic film 2. More specifically, as both the upper brush belt 40 and the lower brush belt 41 are driven to rotate counterclockwise as viewed relative to the transport direction of the photographic film 2, the opening 47a for the upper brush belt 40 is disposed to face the curved portion B adjacent the fan 48 and the opening 47b for the lower brush belt 41 is disposed to face the other curved portion B distant from the fan 48, so as to suck dust adhered to the belts 40, 41 located at the respective curved portions B. In this manner, since the dust adhered to the brush belts 40, 41 is eliminated at the first curved portion B after contact with the photographic film 2, the dust may be eliminated from the brush belts 40, 41 without being scattered about.

At the projection exposure section 5, based on the image information of the photographic film 2 read by the image sensor 15 in association with feeding of the photographic film Z by the rollers 16, 18 and the motor M3, the controller 7 controls the light modulating filter 11 to adjust the irradiation light beam of the projection exposure light source 10 to a color balance according to the color densities of the image of the photographic film 2, and then this adjusted light beam is irradiated on the photographic film 2 to print the image information of the photographic film 2 on the print paper 3.

On the downstream side of the projection exposure section 5 in the transport passage of the print paper, there are disposed rollers 22 for transporting the print paper 3 and a motor M2 for driving the rollers 22.

Though not shown, the developing section D includes a plurality of tanks filled with processing liquids for the development of the exposed print paper 3, such that the print paper 3 is developed by its successive passage through the plurality of tanks.

Next, an exposure operation on the print paper 3 by the image printer 1 will be briefly described.

After start-up of the image printer 1, the photographic film 2 is charged to the projection exposure section 5; then, the motor M3 is activated to start transporting the photographic film 2.

Upon detection of approaching movement of the photographic film 2 by means of an unillustrated sensor, the motor M4 of the dust removing apparatus DR is activated to start rotatably driving the brush belts 40, 41.

As the photographic film 2 is caused to pass the disposing positions of the brush belts 40, 41, dust is removed from the photographic film 2 by the brush belts 40, 41 and this dust picked up by the brush belts 40, 41 is taken off by being sucked by the suction means DS.

After its passage through the dust removing apparatus DR, image information of a frame 2a of the photographic film 2 is read by the image sensor 15 and this frame 2a is transported to an exposing position.

The controller 7 obtains exposure conditions based on the image information read by the image sensor 15 and then produces and presents on the monitor M a simulation image of the information which would result as a photographic printed image on the print paper 3 if the film image were exposed under the obtained exposure conditions.

By observing the displayed image on the monitor M, an operator inputs a correction instruction from a control panel O if such correction is necessary. Otherwise, the operation inputs the exposure conditions without any correction from the control panel O.

With this input of instruction for exposure, at the projection exposure section 5, the image of the photographic film 2 is exposed on the print paper 3 under the determined exposure conditions.

(second embodiment)

A second embodiment will be described next with reference to FIG. 4.

In the above first embodiment, the pair of contact portions of the brush belts 40, 41 of the dust removing apparatus DR contacting respectively the front and back surfaces of the photographic film 2 are driven to rotate in the opposite directions to each other at the single location relative to the transport direction of the photographic film 2. Instead, these contact portions may be driven in a same direction.

Figure 4:
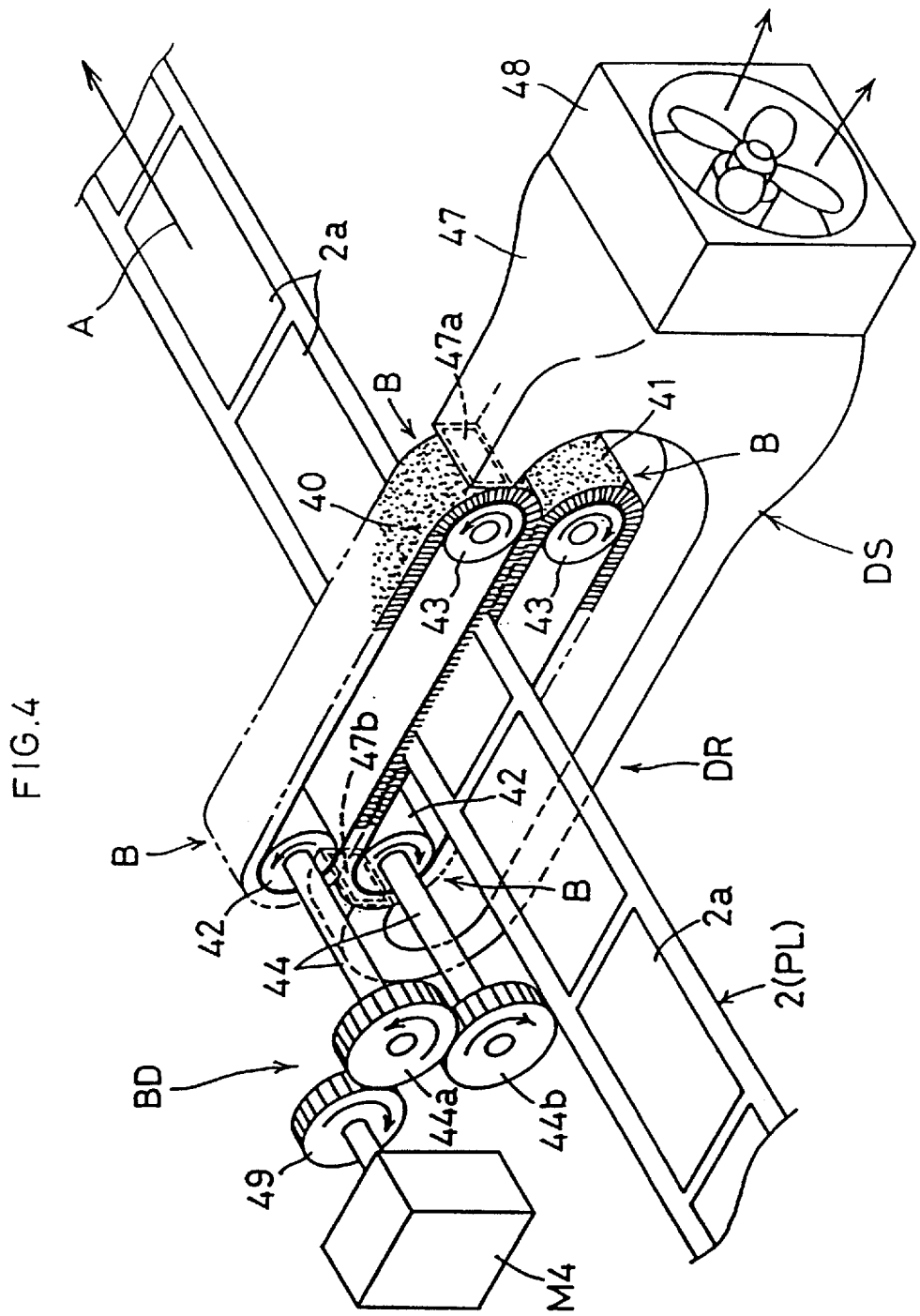
FIG. 4 is a perspective view of major portions relating to a second embodiment of the invention.

That is, as shown in FIG. 4, the two connecting shafts 44 mount gears 44a, 44b of same number of teeth meshing with each other. And, the one gear 44a meshes also the drive gear 49 mounted on the rotary shaft of the motor M4.

With this construction, as the motor M4 rotates, the upper brush belt 40 is driven to rotate counterclockwise relative to the transport direction of the photographic film 2, while the lower brush belt 41 is driven to rotate clockwise relative to the same.

Incidentally, in both the first embodiment and this second embodiment, the transmission mechanism for transmitting the drive of the motor M4 may be modified in a variety of manners.

(third embodiment)

A third embodiment of a dust removing apparatus as incorporated in an image printer will be described with corresponding drawings.

Figure 5:
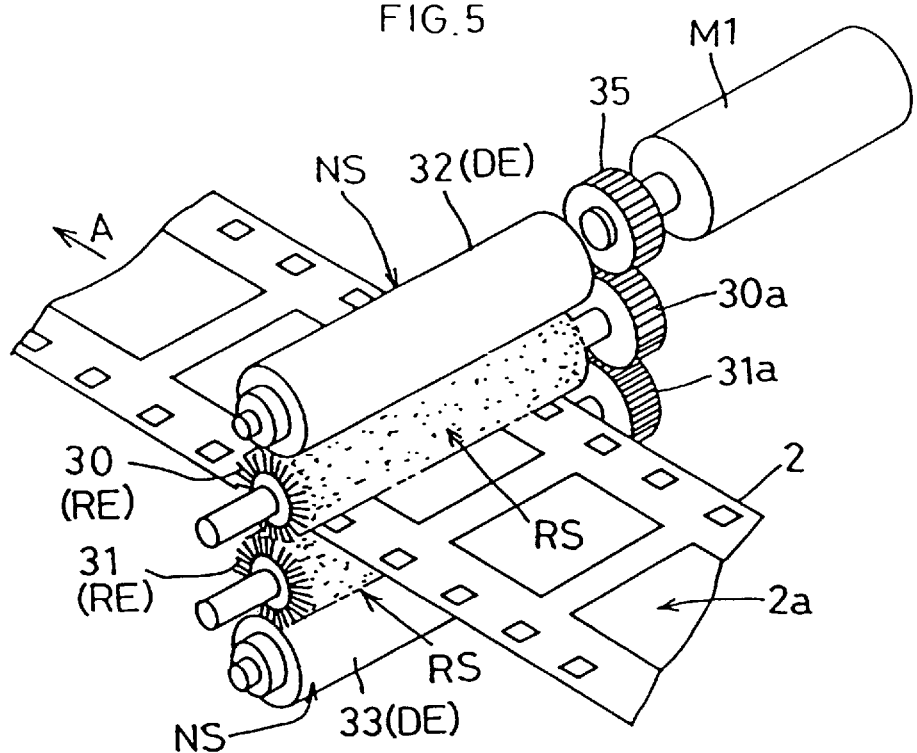
FIG. 5 is a perspective view of major portions relating to a third embodiment of the invention.
Figure 6:
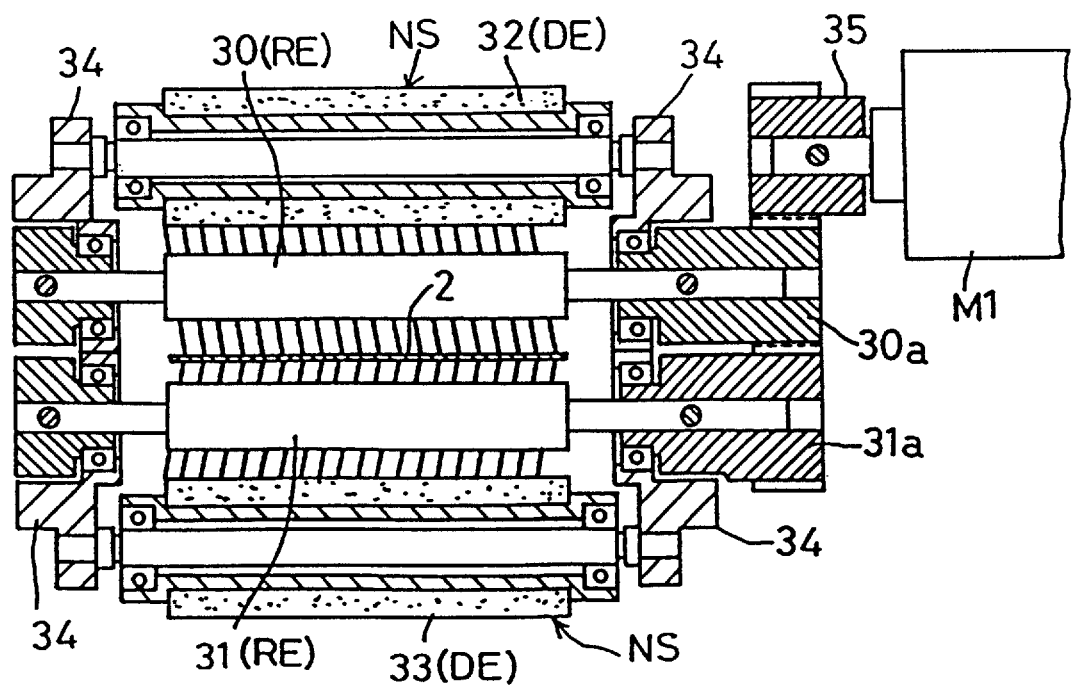
FIG. 6 is a section view of the major portions relating to the third embodiment.
Figure 7:
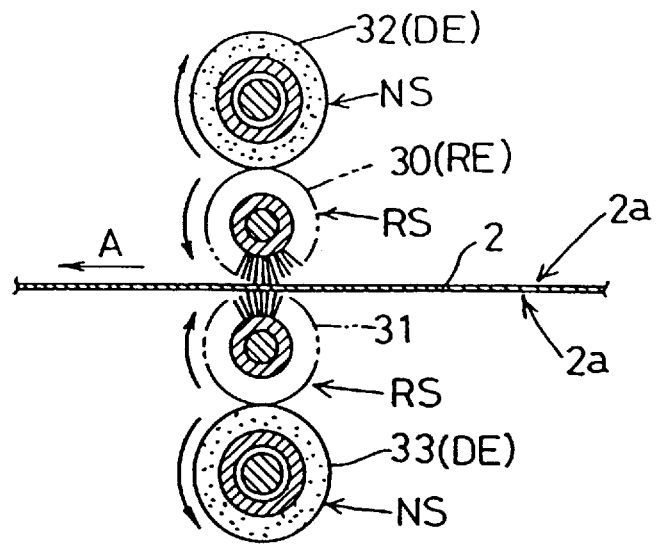
FIG. 7 is a side view of the major portions relating to the third embodiment.

As shown in FIGS. 5 through 7, a dust removing apparatus DR of this embodiment includes brush rollers 30, 31 disposed upwardly and downwardly across the transport passage of the photographic film 2 as first and second dust removing members RE of dust removing means for removing dust from the photographic film 2 through contact therewith, adhesive rollers 32, 33 disposed upwardly and downwardly of the brush rollers 30, 31 as dust take-off means DE for taking off the dust adhered to the brush rollers 30, 31, and a motor M1 as drive means for rotatably driving the brush rollers 30, 31.

The upper brush roller 30 and the lower brush roller 31 are of a same substantially cylindrical configuration, and a peripheral face of each cylindrical roller includes brush bristles made of e.g. PVC to obtain electric conductivity, so that the peripheral faces of these rollers respectively constitute first and second dust removing portions RS.

Further, the upper adhesive roller 32 and the lower adhesive roller 33 are of a same substantially cylindrical configuration and formed mainly of urethane resin material, and the peripheral face of each cylindrical roller, i.e. the face formed of the urethane resin material, is applied with an adhesive material, so that these faces constitute adhesive faces NS.

As shown in a section view of FIG. 6, the brush rollers 30, 31 and the adhesive rollers 32, 33 are rotatably supported via bearings to a stationary support frame 44, and leading ends of the bristles of the upper and lower brush rollers 30, 31 are placed in contact with the adhesive faces NS of the adhesive rollers 32, 33, respectively.

As shown in FIGS. 5 and 6, the drive of the motor M1 is transmitted to the respective brush rollers 30, 31 through meshing between the drive gear 35 mounted on the rotary shaft of the motor M1 and a driven gear 30a mounted on a rotary shaft of the upper brush roller 30 and meshing between this driven gear 30a and a driven gear 31a mounted on a rotary shaft of the lower brush roller 31.

As shown in FIG. 7, relative to the transport direction of the photographic film 2 denoted with an arrow A, the upper brush roller 30 is driven to rotate counterclockwise while the lower brush roller 31 is driven to rotate clockwise.

The adhesive rollers 32, 33 are not directly driven by the motor M1, but through their contact with the brush rollers 30, 31, the upper adhesive roller 32 is rotated clockwise and the lower adhesive roller 33 is rotated counterclockwise in FIG. 7.

As the brush rollers 30, 31 and the adhesive rollers 32, 33 are rotated in the above-described manners, i.e. various portions of the dust removing faces RS are continuously and alternately brought to the dust removing positions, namely, the positions contacting the photographic film 2, dust adhered to the film faces 2a of the photographic film 2 transported in the direction of arrow A is picked up without being scattered over to the upstream side of the transport direction of the photographic film 2. and this dust adhered to the dust removing faces RS of the brush rollers 30, 31 is eliminated therefrom by the adhesive force of the adhesive faces NS of the adhesive rollers 32, 33 at non-removing positions on the opposite side to the contact positions with the photographic film 2.

The dust adhered to the adhesive faces NS of the adhesive rollers 32, 33 may be cleaned periodically.

Next, an exposure operation on the print paper 3 by the image printer 1 will be briefly described.

After start-up of the image printer 1, the photographic film 2 is charged to the projection exposure section 5; then, the motor M3 is activated to start transporting the photographic film 2.

Upon detection of approaching movement of the photographic film 2 by means of an unillustrated sensor, the motor M1 of the dust removing apparatus DR is activated to start rotatably driving the brush rollers 30, 31.

As the photographic film 2 is caused to pass the disposing positions of the brush rollers 30, 31, dust is removed from the photographic film 2 by the brush rollers 30, 31 and this dust picked up by the brush rollers 30, 31 is eliminated therefrom by the adhesive rollers 32, 33.

After its passage through the dust removing apparatus DR, image information of a frame 2a of the photographic film 2 is read by the image sensor and this frame 2a is transported to an exposing position.

The controller 7 obtains exposure conditions based on the image information read by the image sensor 15 and then produces and presents on the monitor M a simulation image of the information which would result as a photographic printed image on the print paper 3 if the image were exposed under the obtained exposure conditions.

By observing the displayed image on the monitor M, an operator inputs a correction instruction from the control panel O if such correction is necessary. Otherwise, the operation directly inputs the exposure conditions without any corrections from the control panel O.

With this input of instruction for exposure, at the projection exposure section 5, the image of the photographic film 2 is exposed on the print paper 3 under the determined exposure conditions.

(fourth embodiment)

Next, a fourth embodiment of the invention will be described with reference to FIG. 8.

In the above third embodiment, the dust sticking to the photographic film 2 is eliminated only by the brushy peripheral faces of the brush rollers 30, 31. Instead, as shown in FIG. 8, the brush rollers 30, 31 as the dust removing members RE, may include, at right and left ends thereof as predetermined positions, auxiliary adhesive faces 30b, 31b having adhesive property so as to eliminate the dust from the photographic film 2 with a stronger force than that provided by the brush faces.

More particularly, the auxiliary adhesive faces 30b, 31b will be provided in a limited manner only at such portions corresponding to particular portions of the photographic film where more thorough dust cleaning is desired. In this respect, through appropriate adjustment of mixing ratio of the materials forming the adhesive material used, the adhesive force of the auxiliary adhesive faces 30b, 31b is rendered positively weaker than the adhesive force of the adhesive faces NS of the adhesive rollers 32, 33, such that the dust adhered to the auxiliary adhesive faces 30b, 31b may be reliably eliminated by the adhesive rollers 32, 33.

Figure 8:
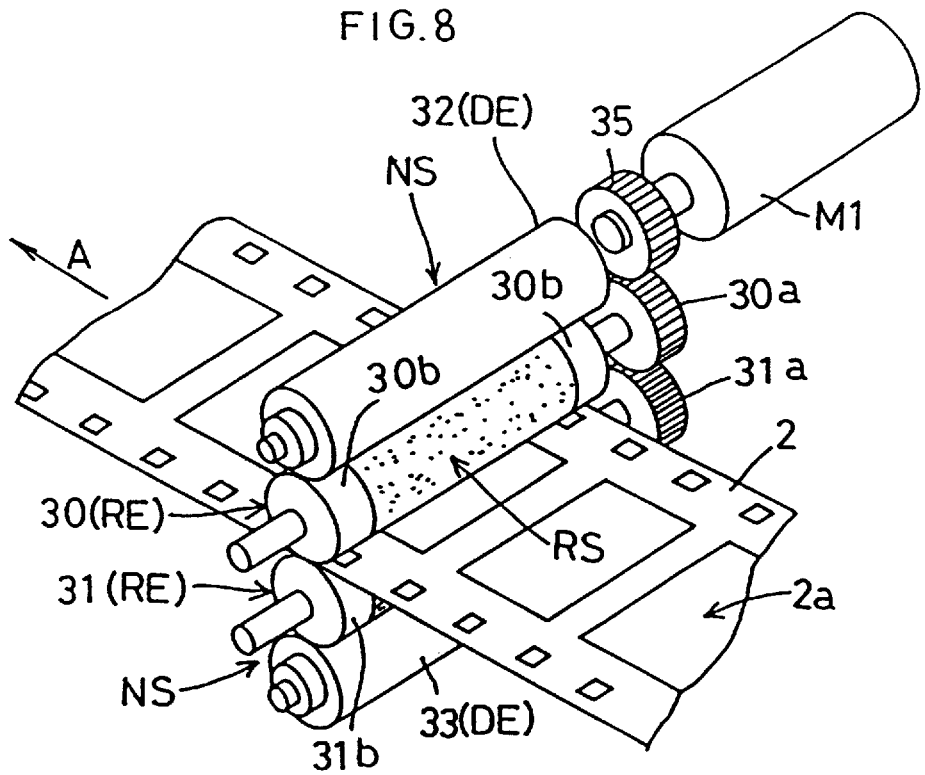
FIG. 8 is a perspective view of major portions relating to a fourth embodiment of the invention.

In the sample condition shown in FIG. 8, the positions of the auxiliary adhesive faces 30b, 31b are caused to correspond to the position of perforations of the photographic film, so that these areas of perforations may be cleaned more thoroughly than the other portion of the photographic film so as to assure higher reliability for a reading operation of the perforations per se by an optical sensor and a reading operation of a DX code recorded in the vicinity of the perforations by means of optical sensors.

Incidentally, in the case of the construction shown in FIG. 8, the auxiliary adhesive faces 30b, 31b are rotatable together with the brush rollers 30, 31. Instead, the roller portions forming the auxiliary adhesive faces 30b, 31b and those portions of the adhesive rollers 32, 33 contacting the auxiliary adhesive faces 30b, 31b may be rendered freely rotatable, so as to smooth the dust removal and transportation of the photographic film 2.

(fifth embodiment)

Next, a fifth embodiment of the invention will be described with reference to corresponding drawings.

Figure 9:
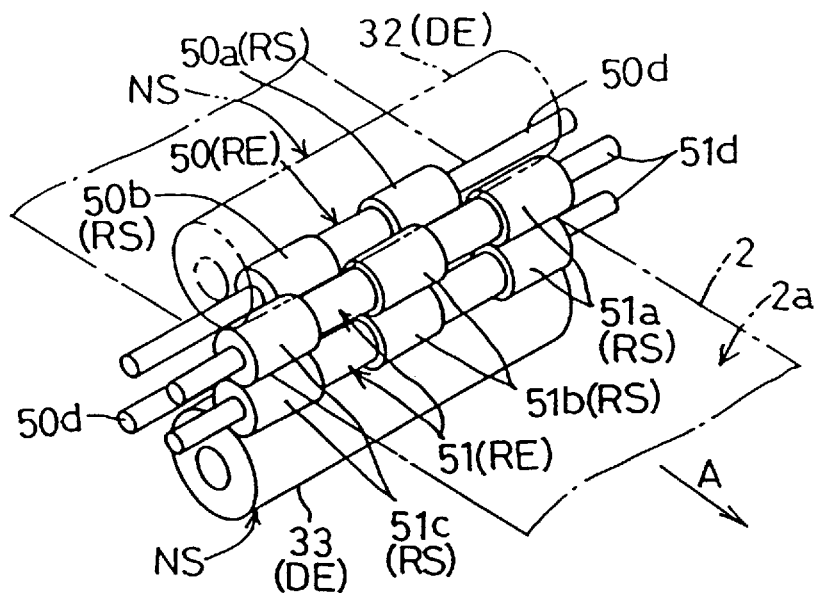
FIG. 9 is a perspective view of major portions relating to a fifth embodiment of the invention.
Figure 10:
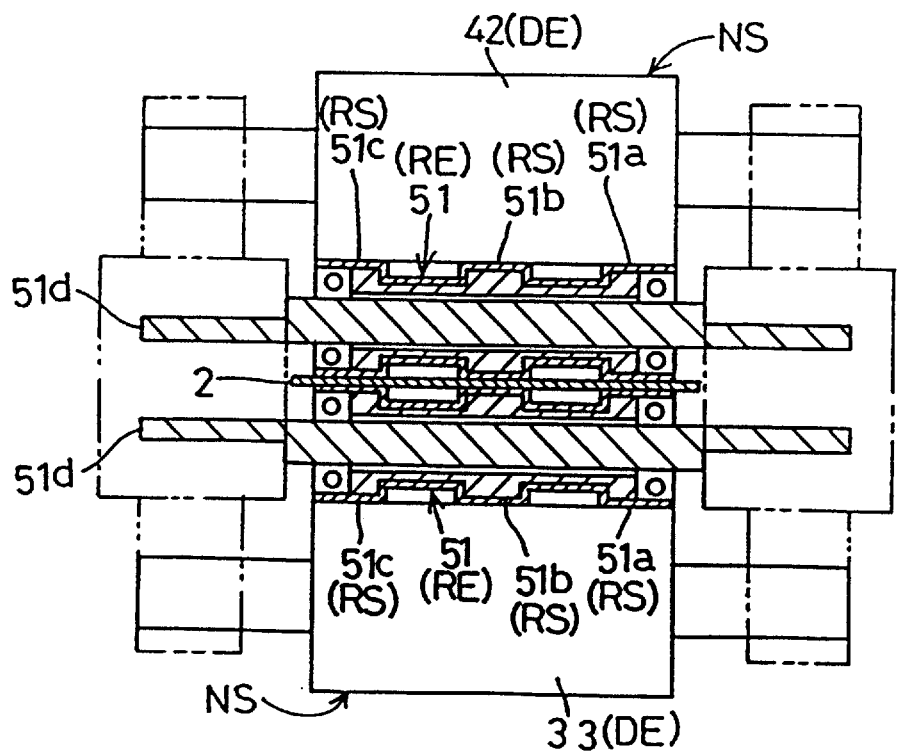
FIG. 10 is a section view of the major portions relating to the fifth embodiment.
Figure 11:
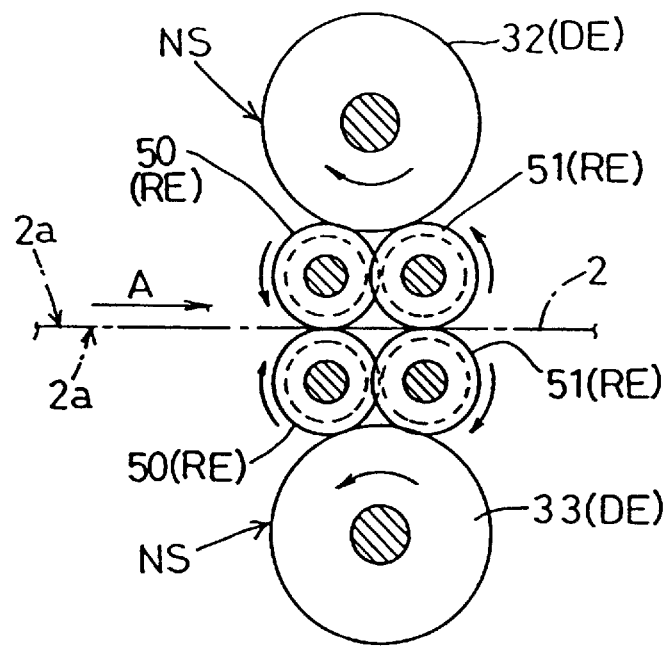
FIG. 11 is a side view of the major portions relating to the fifth embodiment.
Figure 12:
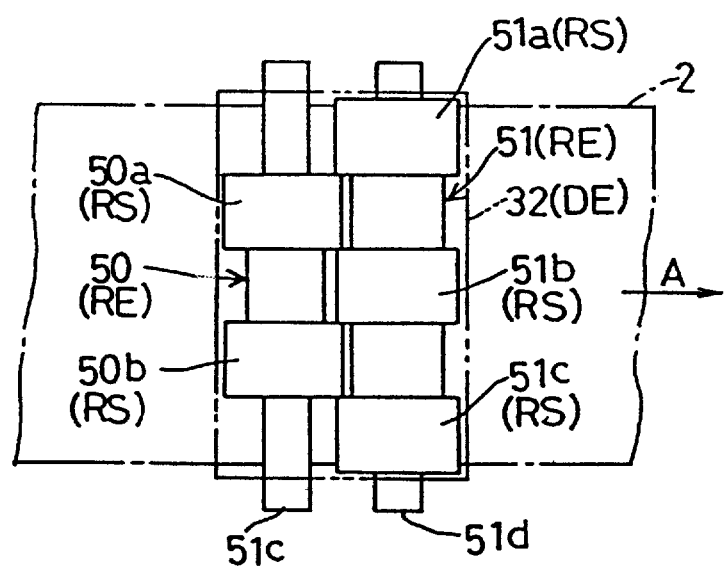
FIG. 12 is a plan view of the major portions relating to the fifth embodiment of the invention.

In the foregoing third embodiment, the dust adhered to the photographic film 2 is picked up by the brushy dust removing faces RS of the brush rollers 30, 31. Alternatively, as shown in FIGS. 9 through 11, as dust removing means RE for removing the dust from the front and back film surfaces 2a of the photographic film 2, two segmented type adhesive rollers 50, 51, as first and second dust removing members, may be provided as dust removing means RE to contact the photographic film from the above and under the photographic film 2 one after the other in the transportation direction of the photographic film 2.

Of the two segmented type adhesive rollers 50, 51, the adhesive roller 50 disposed on the upstream side relative to the transportation direction of the photographic film 2 includes, at two separate portions thereof, adhesive faces 50a, 50b as the dust removing faces. The other adhesive roller 51 disposed on the downstream side relative to the transportation direction of the photographic film 2 includes, at three separate portions thereof, adhesive faces 51a, 51b as the first and second dust removing portions RS and still another adhesive face 51c. The adhesive faces 50a, 50b of the roller 50 and the adhesive faces 51a, 51b, 51c of the roller 51 are disposed alternately relative to the width of the photographic film 2 with leading ends thereof being slightly overlapped with each other, Through the above-described arrangement of the adhesive faces 50a, 50b, and the adhesive faces 51a, 51b, 51c, as viewed from the longitudinal direction of the photographic film 2, at any location throughout the entire width of the photographic film 2, at least one of the adhesive faces 50a, 50b or the adhesive faces 51a, 51b, 51c is present, so that the entire faces of the photographic film 2 may be subjected to the dust removal operation.

Like the foregoing embodiment, the adhesive faces 50a, 50b and the adhesive faces 51a, 51b, 51c are placed in contact with the adhesive rollers 32, 33 at the non-removing positions substantially on the opposite side to the contacting positions with the photographic film 2. Furthermore, through the appropriate adjustment of mixing ratio of adhesive materials used, the adhesive force of these adhesive faces 50a, 50b, 51a, 51b, 51c is rendered weaker than the adhesive force of the adhesive faces NS of the adhesive rollers 32, 33, such that the dust adhered to the faces 50a, 50b, 51a, 51b, 51c from the photographic film 2 may be reliably removed therefrom by the adhesive rollers 32, 33.

The segmented type adhesive rollers 50, 51 having the above-described constructions are disposed symmetrically across the transporting position of the photographic film 2 and remove the dust from the front and back surfaces 2a of the photographic film 2.

Incidentally, the segmented type adhesive rollers 50, 51 are rotatably driven through their contact with the transported photographic film 2 and various portions of the dust removing faces RS are continuously and alternately brought to the positions contacting the photographic film 2. Hence, no motor is absolutely specially needed for driving these segmented type adhesive rollers 50, 51. Yet, in order to reduce load on the motor M3 which transports the photographic film 2, an additional motor may be provided for this special purpose as well.

As to the placement of the segmented type adhesive rollers 50, 51, instead of the above-described placement in which the leading ends of the adhesive faces 50a, 50b are slightly overlapped with the leading ends of the adhesive faces 51a, 51b, 51c, the rollers 50, 51 may be disposed away from each other relative to the longitudinal direction of the photographic film 2, and the lateral widths of the faces 50a, 50b and faces 51a, 51b, 51c may be extended respectively, so that the width-wise ends of the adhesive faces 50a, 50b, and those of the adhesive faces 51a, 51b, 51c are overlapped with each other relative to the longitudinal direction of the photographic film 2. Further, more than three segmented type adhesive rollers 50, 51 may be employed. And, the number of adhesive faces RS may be conveniently varied.

Further, instead of the segmented type adhesive rollers 50, 51, the substantially cylindrical adhesive rollers like the adhesive rollers 32, 33 may be employed as well.

(sixth embodiment)

Next, a sixth embodiment of the invention will be described with reference to FIGS. 13 through 16.

Figure 13:
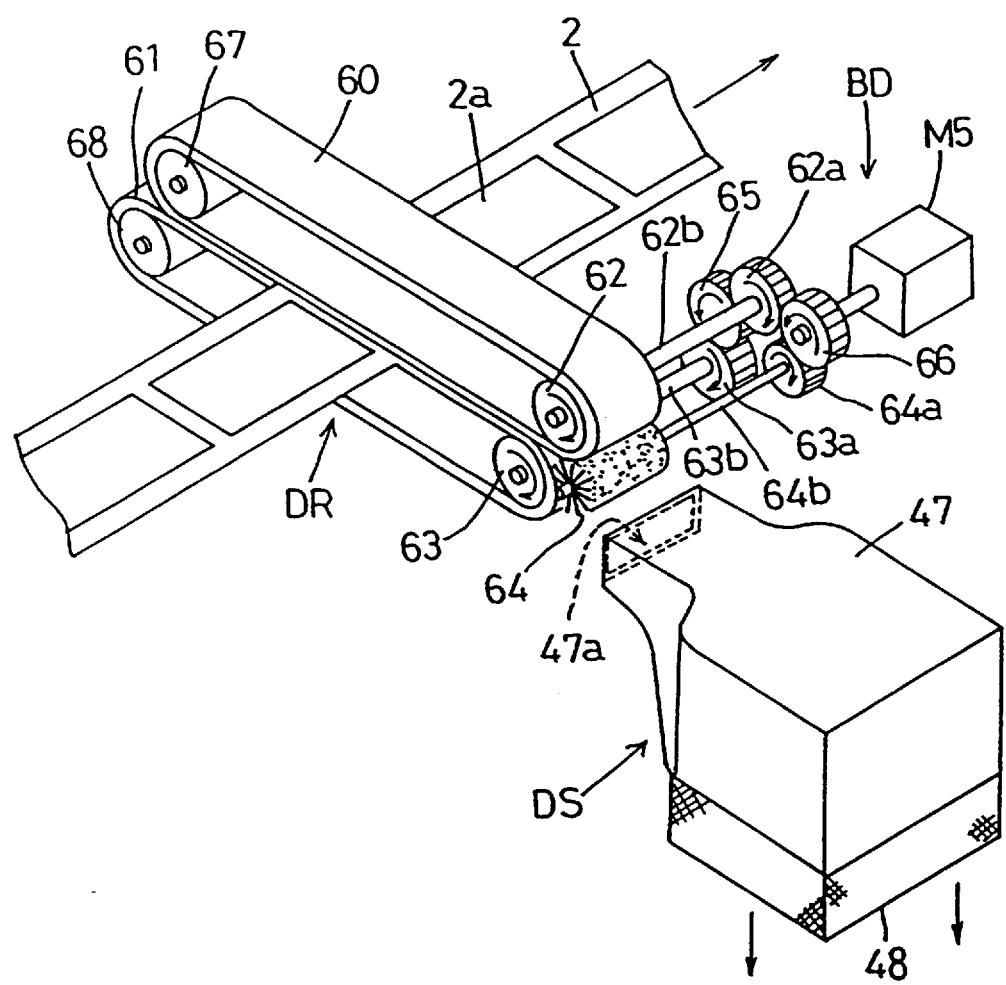
FIG. 13 is a perspective view of major portions relating to a sixth embodiment of the invention.

As shown in FIG. 13, a dust removing apparatus DR of this embodiment includes, as endless belt type dust removing members RE, an upper cleaning belt 60 and a lower cleaning belt 61 disposed respectively above and under the photographic film 2. The apparatus further includes suction means DS for sucking dust from the dust adhered to the upper and lower cleaning belts 60, 61, and drive means BD for rotatably driving the upper and lower cleaning belts 60, 61. The suction means DS functions as the dust take-off member DE.

The drive means BD includes a drive roller 62 and a driven roller 67 about which the upper cleaning belt 60 is entrained, a drive roller 63 and a driven roller 68 for driving the lower cleaning belt 61, a driven gear 62a mounted on a connector shaft 62b to be driven in unison with the drive roller 62 mounted on the same connector shaft, a driven gear 63a mounted on a connector shaft 63b to be driven in unison with the drive roller 63 mounted on the same connector shaft, a motor M5 for rotatably driving the cleaning belts 80, 61, a motor roller 66 attached to a leading end of a rotary shaft of the motor M5, a substantially cylindrical brush roller 64 disposed so as to contact with both a curved portion B of the upper cleaning belt 60 and a curved portion B of the lower cleaning belt 61, a brush gear 64a mounted on a connector shaft 64b to be rotatable in unison with the brush roller 64 mounted on the same connector shaft, and an idle gear 65 for matching the rotation directions of the drive rollers 62, 63.

The suction means DS includes an air duct 47 having an opening 47a adjacent an outer periphery of the brush roller 64 and a fan 48 communicated with the air duct 47.

Figure 15:
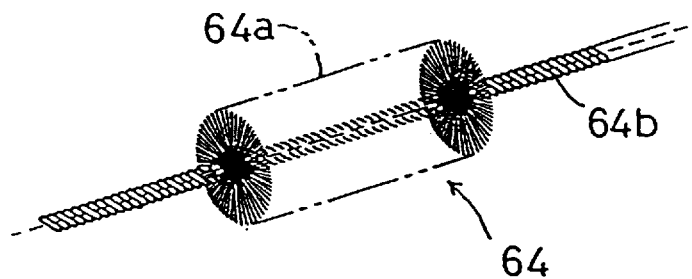
FIG. 15 is an enlarged view of a brush roller.

The detailed construction of the brush roller 64 is shown in FIG. 15. As shown, the roller includes a shaft 64b made of stainless steel and bristles 64a mounted on the periphery of the shaft 64b.

Dust adhered to the upper and lower cleaning belts 60, 61 is picked up by the brush roller 46 and this dust picked up by the roller 46 is eliminated by being sucked by the suction means DS.

Figure 16:
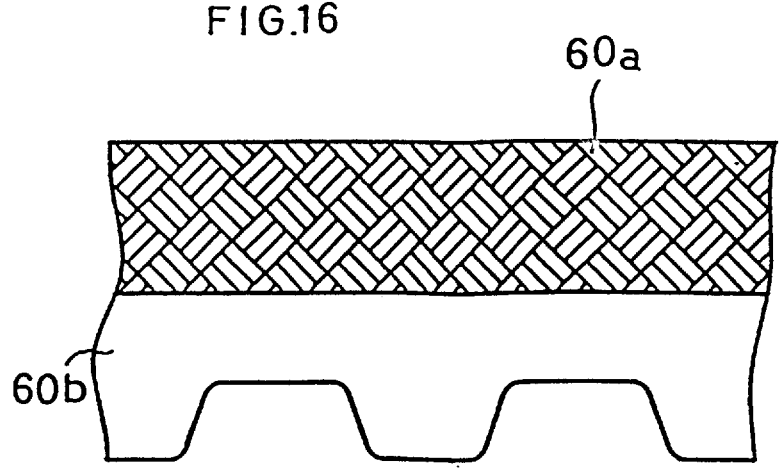
FIG. 16 is an enlarged view of a cleaning belt.

FIG. 16 is an enlarged view of an end face of the cleaning belts 60, 61. A side portion of this belt 60 or 61 contacting the photographic film 2 is formed as an urethane cloth portion 60*a* and the opposite side portion is formed as a timing-belt portion 60*b*.

Outer peripheries of the drive rollers 62, 63 and of the driven rollers 66, 67 are configurated so as to engage with the timing-belt portion 60*b*.

In comparison with the brush belts 40, 41 used in the first embodiment, the construction using this urethane cloth portion is advantageous for not producing dust of its own, so that the dust removing operation may be effected more efficiently. That is to say, in the case of the brush belts 40, 41, the brushes may produce dust of their own, so that the suction means DS needs to have a sufficiently large suction capacity. Incidentally, this urethane cloth portion 60*a* is formed of a base of velvet covered with a urethane layer.

As the motor gear 66 is driven counterclockwise in FIG. 13 by the motor M5, the drive roller 62 is rotated clockwise. The rotation of the motor gear 66 is transmitted via the driven gear 62*a* and the idle gear 66 to the driven gear 63*a* to rotate the drive roller 63 clockwise.

Accordingly, since both of the upper cleaning belt 60 and the lower cleaning belt 61 are driven to rotate clockwise as viewed from the transport direction of the photographic film 2, the pair of contact portions of the cleaning belts 60, 61 contacting the front and back surfaces of the photographic film 2 are rotated in the opposite direction to each other at the single location on the transport direction of the photographic film 2.

As the drive rollers 62, 63 and the driven rollers 67, 68 are disposed away from each other on the right and left sides relative to the photographic film 2, the curved portions B of the cleaning belts 60, 61 formed by the drive rollers 62, 63 and the driven rollers 67, 68 too are located away from the photographic film 2.

Further, the brush roller 64 is rotated clockwise in FIG. 13. Then, by utilizing a centrifugal force associated with this roller rotation, the dust adhered to the brush roller 64 may be removed by the sucking force of the fan 48 efficiently. Further, by forming the brush roller 64 of electrically conductive material, it is possible to prevent electric charging of the photographic film 2.

Figure 14:
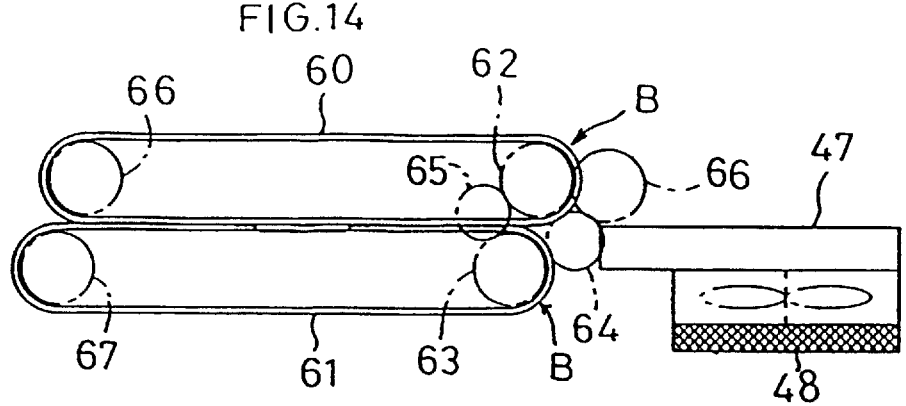
FIG. 14 is a side view of major portions relating to a seventh embodiment of the invention.

As may be understood from the side view of FIG. 14, the drive roller 62 and the drive roller 63 are offset to the right and left from each other relative to the transport direction of the photographic film 2. With this placement, the outer periphery of the brush roller 64 may be efficiently placed in contact with the curved portions B of the upper and lower cleaning belts 60, 61.

As described above, the dust is removed at a position different from the position of the photographic film 2 as the dusty surface to be treated, so that there occurs no inconvenience of reverse attachment of the dust to the photographic film 2.

(seventh embodiment)

Figure 17:
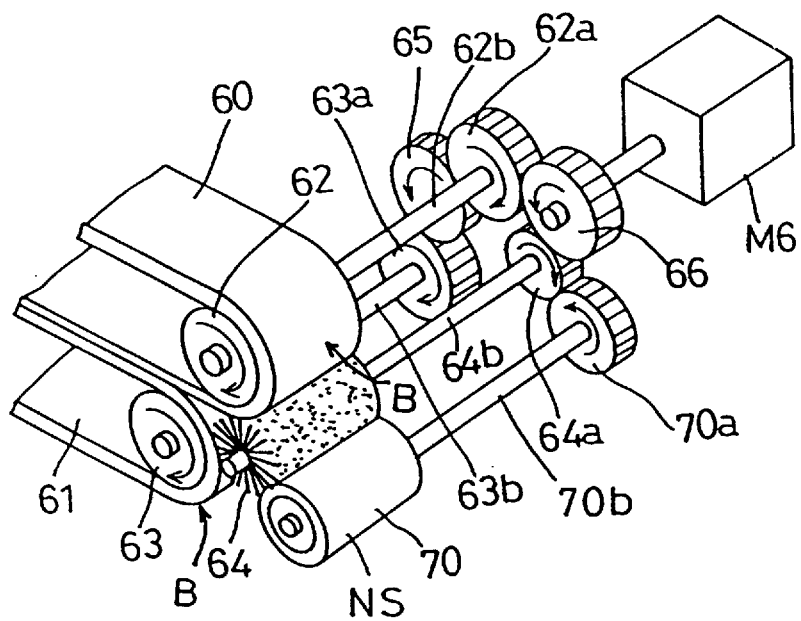
FIG. 17 is a perspective view of major portions relating to a seventh embodiment of the invention.

Next, a seventh embodiment of the invention will be described with reference to FIG. 17.

This embodiment differs from the sixth embodiment in that instead of the suction means DS comprised of the air duct 47 and the fan 48 there is provided a substantially cylindrical adhesive roller 70. This adhesive roller 70 is integrally connected with the driven gear 70*a* via a common connector shaft 70*b*. That is to say, the dust adhered to the brush roller 64 is eliminated by the adhesive roller 70.

This adhesive roller 70 is a substantially cylindrical member formed mainly of urethane resin material and the outer peripheral face of the cylindrical member is coated with adhesive material to provide an adhesive face NS.

In order to drive the adhesive roller 70, the motor M6 rotates the motor gear 66 and this rotation is transmitted via the driven gear 64*a* to a driven gear 70*a*.

In comparison with the foregoing construction using the air duct 47 and the fan 48, this construction using the adhesive roller 70 is advantageous for allowing further size reduction of the entire apparatus.

(eighth embodiment)

Figure 18:
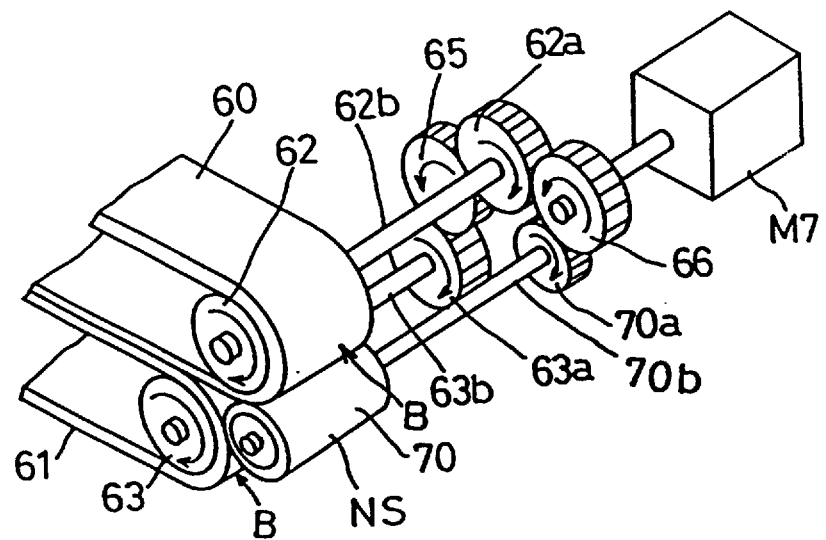
FIG. 18 is a perspective view of major portions relating to an eighth embodiment of the invention.

An eighth embodiment of the invention will be described next with reference to FIG. 18.

In this eighth embodiment, the outer peripheral face of the adhesive roller 70 is placed in contact with the upper and lower cleaning belts 60, 61. With this construction, the dust may be removed directly by the adhesive roller 70 without the brush roller, so that this construction allows still further reduction in the size of the entire apparatus in comparison with the apparatus of the seventh embodiment.

(ninth embodiment)

A ninth embodiment of the invention will be described next with reference to FIGS. 19, 20 and 21.

This embodiment relates to a further modified dust removing apparatus construction using belts.

For a dust removing operation, the photographic film 2 must pass through the dust removing face RS. That is, the photographic film 2 must pass between the upper belt and lower belt. As means for facilitating this passage, it is conceivable to cause the upper belt and the lower belt to cross each other as viewed from above the film transporting plane.

However, with such means, if the leading end of the film is curled or bent, a jamming of the photographic film may occur.

In this respect, according to the instant embodiment, the dust removing faces RS are rendered to open and close relative to each other, and, more particularly, the dust removing faces are movable between a first position where the faces do not provide dust removing action to the photographic film 2 and a second position where the faces provide the removing action to the same.

Figure 19:
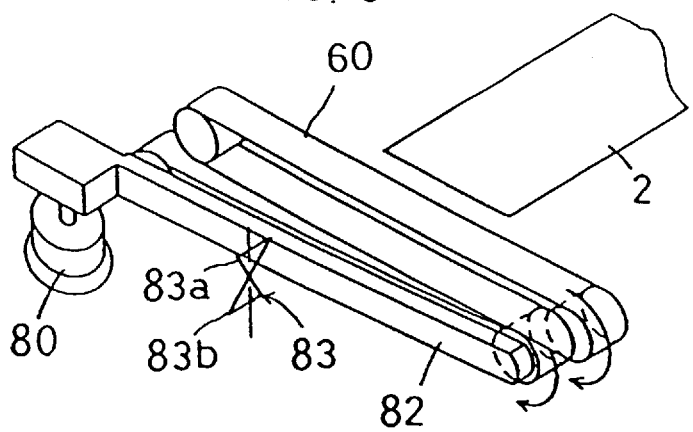
FIG. 19 is a perspective view of major portions relating to a ninth embodiment under a condition before insertion of a photographic film.
Figure 20:
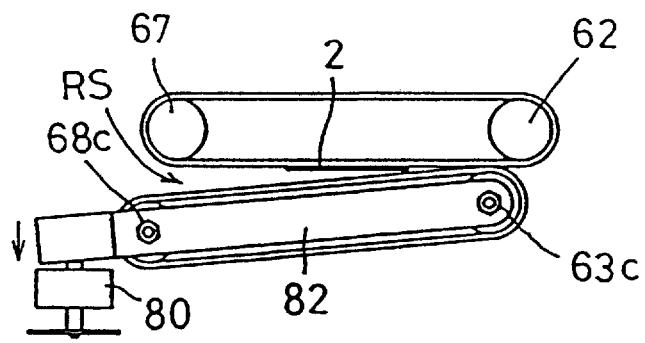
FIG. 20 is a side view of the major portions relating to the ninth embodiment under the condition before the insertion of the photographic film film.

FIG. 19 illustrates the condition where the dust removing faces RS are located at the first position and FIG. 20 illustrates the further condition where the faces RS are located at the second position.

Figure 21:
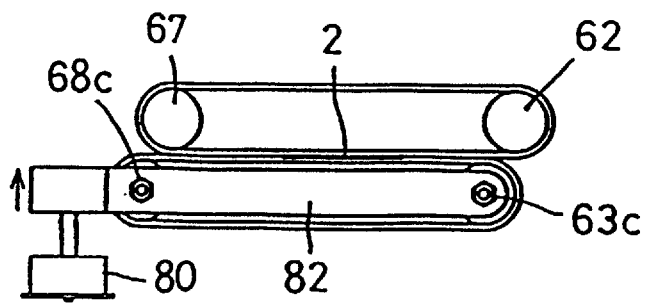
FIG. 21 is a side view of the major portions relating to the ninth embodiment under a further condition after the insertion of the photographic film film.

Incidentally, the detailed constructions of the entire dust removing apparatus are not shown in FIGS. 19, 20 and 21.

A guide member 82 is connected to an output portion of a solenoid 80 and the guide member 82 and the lower cleaning belt 61 are connected integrally with each other. More specifically, the member 82 and the belt 61 are connected via shafts 63*a*, 68*c* disposed at the centers of the drive roller 63 and the driven roller 68 respectively. The solenoid 80 functions as drive means for driving the dust removing faces RS to be opened and closed relative to each other.

An optical sensor 83 including a light emitting element 83*a* such as a light emitting diode and a light receiving element 83*b* such as a light receiving transistor is provided for detecting presence and absence of the photographic film 2. This optical sensor 83 functions as detecting means for detecting presence/absence of the photographic film 2.

When the photographic film 2 is absent, as illustrated in FIG. 19, the guide member 82 is slightly inclined as viewed from the transport direction of the photographic film. So that, the dust removing faces RS are opened relative to each other to allow smooth insertion of the photographic film 2 between the dust removing faces (i.e, between the upper and lower cleaning belts 60, 61).

When the photographic film 2 passes between the dust removing faces, this passage of the photographic film 2 is detected by the optical sensor 83. Upon this detection, the solenoid 80 is switched ON, so as to drive the guide member 82 from the first position shown in FIG. 19 or FIG. 20 to the second position shown in FIG. 21. Thereafter, the unillustrated dust removing apparatus is activated for effecting a dust removing operation.

After completion of the dust removing operation on the photographic film 2, the photographic film 2 is moved away from the dust removing faces RS. This movement of the photographic film 2 away from the dust removing faces RS too is detected by the optical sensor 83, and with this detection the solenoid 80 is switched OFF. Whereby, the dust removing faces RS are returned from the second position to the first position and maintained at this position until insertion of a next photographic film 2.

The above operations are automatically controlled by the controller 7.

(tenth embodiment)

Figure 22:
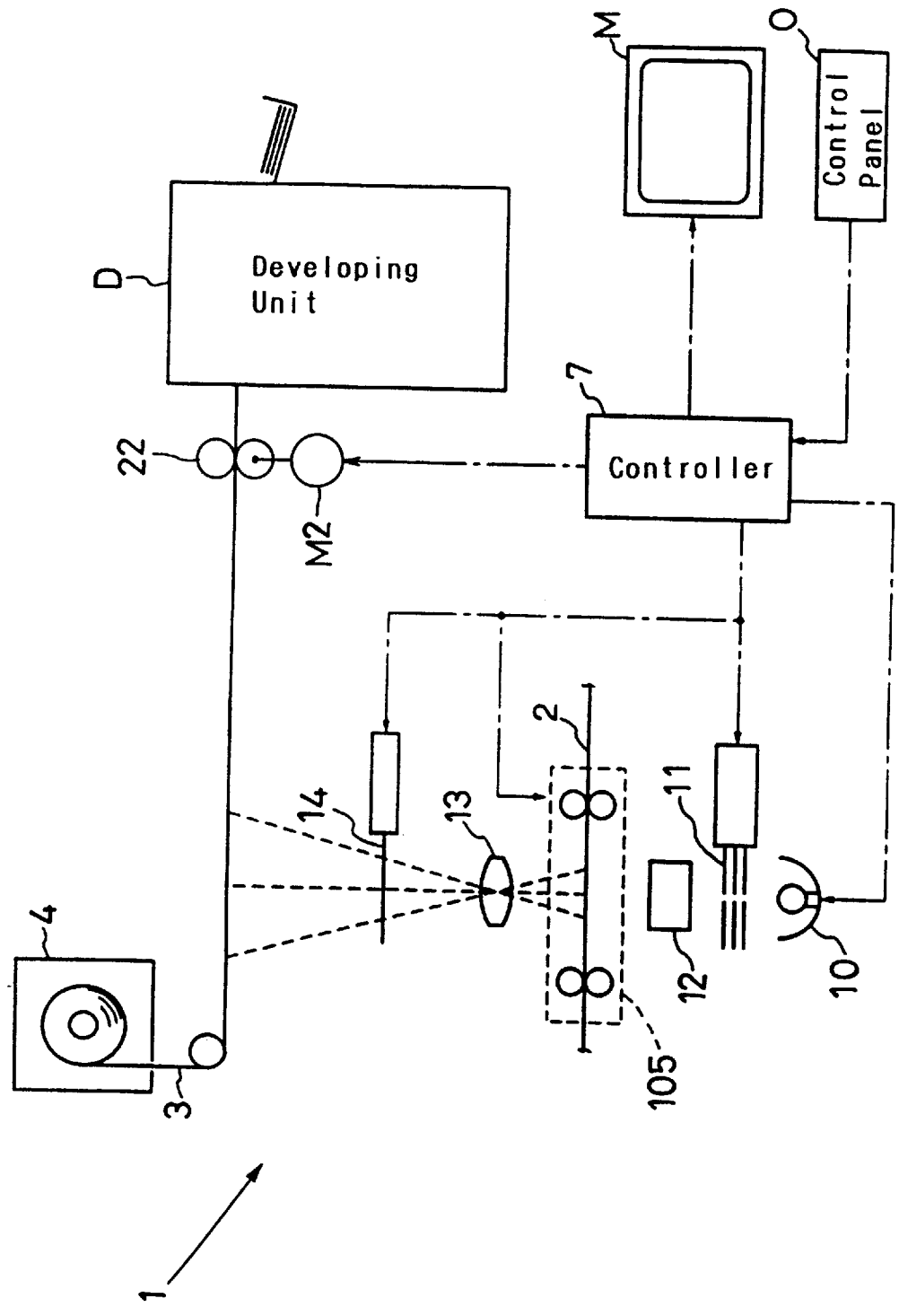
FIG. 22 is a diagram showing an image printer equipped with a dust removing apparatus according to a tenth embodiment of the invention.

Next, with reference to FIGS. 22 through 30, there will be described a still further embodiment in which the dust removing apparatus relating to the present invention is used in a photographic processing system for processing a film having magnetic recording portions. In FIG. 22, components corresponding to those shown in FIG. 1 are denoted with the same reference numerals, and in the following description, such components shown in FIG. 1 will not be described in repetition. Further, it is understood that features disclosed in the instant embodiment may be employed in all of the foregoing embodiments unless any contradictions may occur and conversely that all the features of the foregoing embodiments may be employed in the instant embodiment unless any contradictions may occur. It is also understood that the above also applies to between and among all of the foregoing embodiments.

In FIG. 22, the dust removing apparatus according to this embodiment is shown within a film transport unit 105.

First, the film 2 to which the present embodiment relates will be described with reference to FIG. 25. This film 2 is used in the new system commonly referred to as APS. The film 2 includes an image recording portion 2a for recording images, magnetic recording portions 2b provided upwardly and downwardly of the image recording portion 2a, and perforations 2c. This film 2 is stored within a film cartridge 180 shown in FIG. 27, which in turn is attached to a cartridge holder 140. Then, the film 2 is withdrawn from the cartridge and transported in the direction A which is the transporting direction of the film 2. The further direction B is the opposite direction to the direction A.

The film transport unit 105 includes, as paired frame members, upper and lower units 120, 121 which are connected to be pivotable to each other about a shaft 122, with the units being urged to open by means of springs 123.

Figure 23:
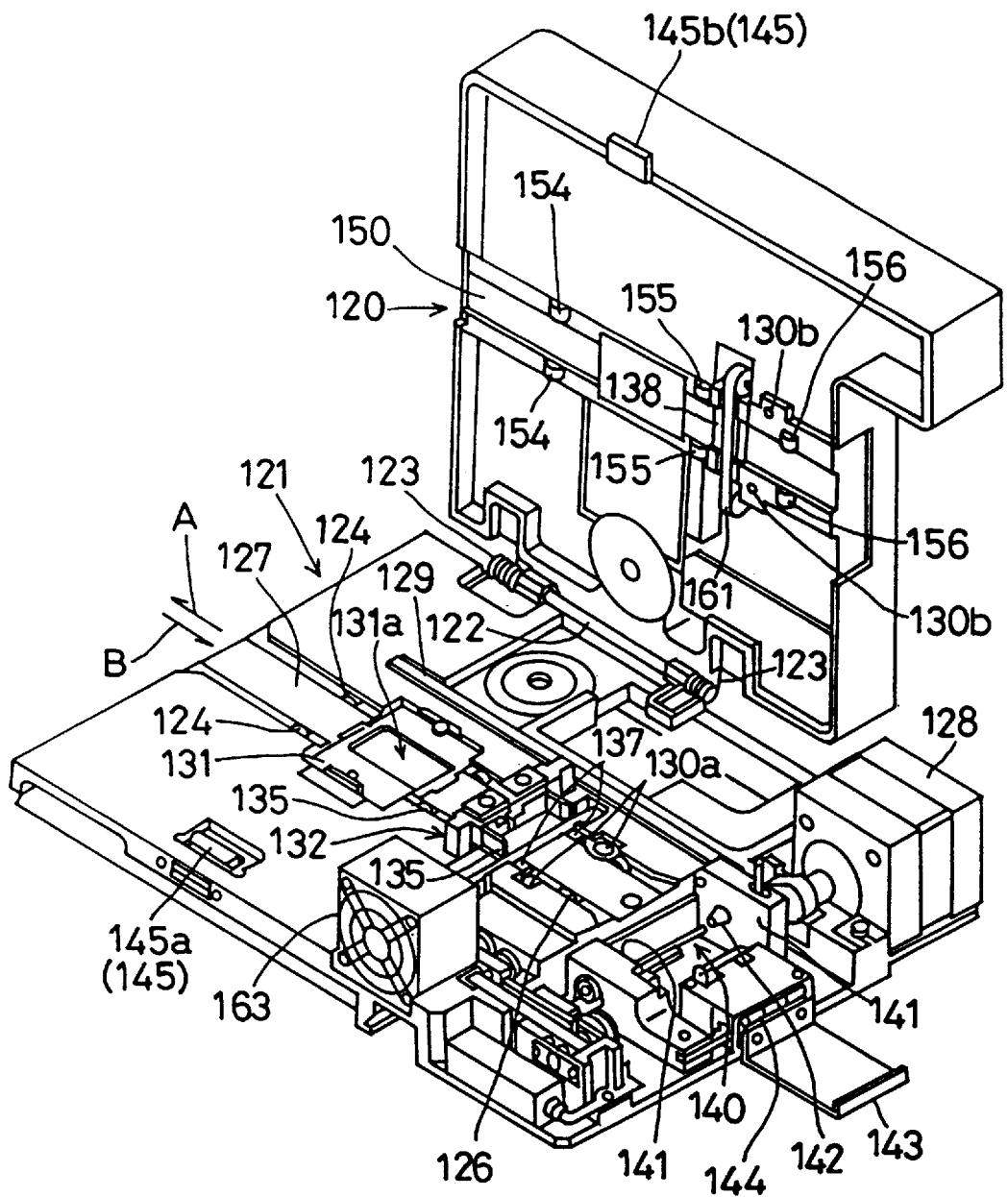
FIG. 23 is an overall perspective view of a film transport unit.
Figure 24:
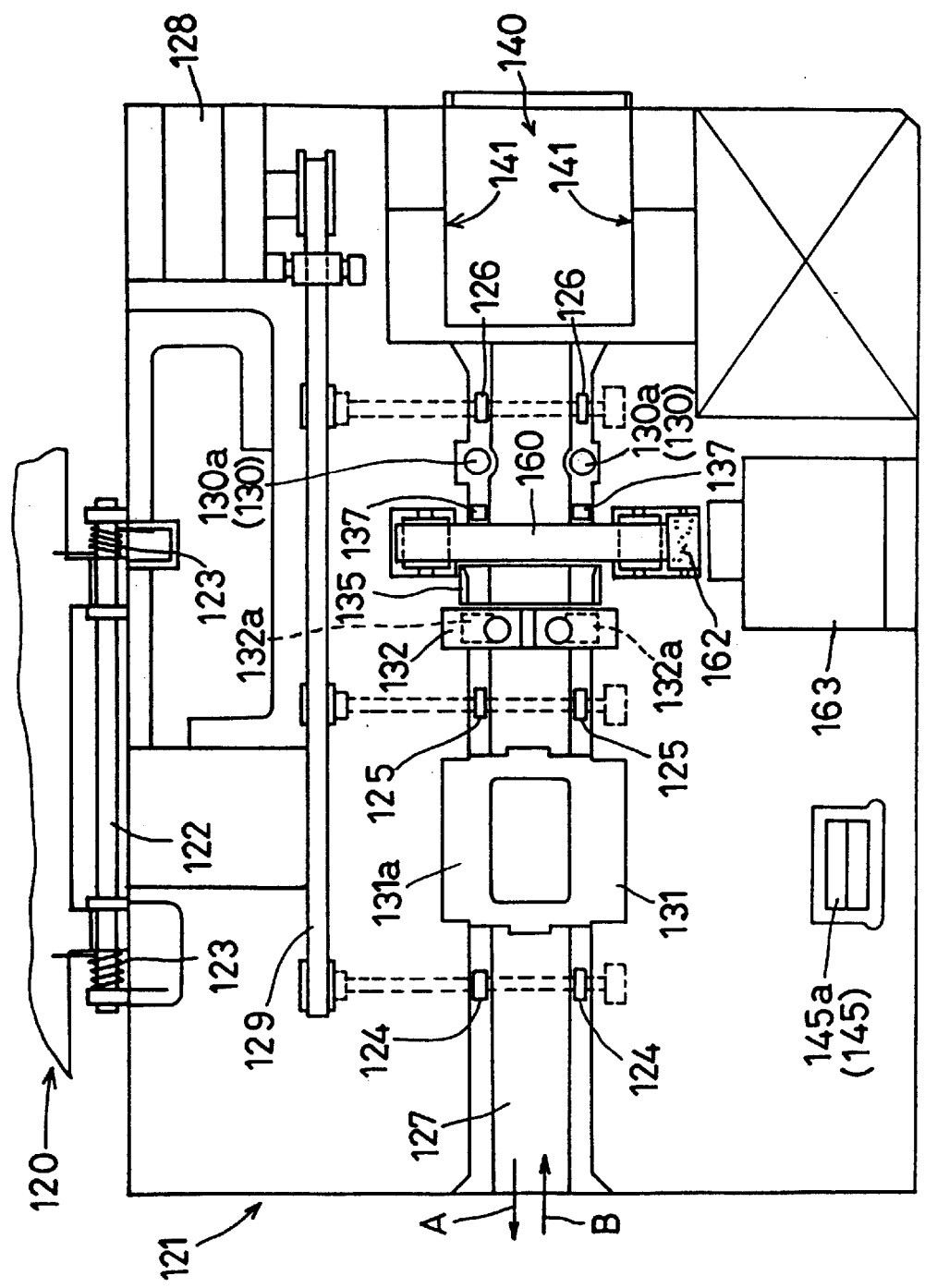
FIG. 24 is a plan view of the film transport unit shown in FIG. 22.

The open condition of the upper and lower units 120, 121 is shown in FIG. 23. FIG. 24 is a plan view of the lower unit 121.

The lower unit 121 is shown in details in FIGS. 23 and 24. The unit includes drive rollers 124, 125, 126 for transporting the film 2. The unit further includes a lower guide 127 provided as a recess at a portion where the image bearing face of the film is caused to pass. This lower guide 127 in cooperation with an upper guide 150 of the upper unit 120 to be described later, supports and guides the right and left ends of the film 2. The drive rollers 124, 125, 126 are driven via a belt 129 by means of a motor 128. The lower unit includes a beam emitting portion 130a of an optical sensor 130 which portion cooperates with a beam receiving portion 130a included in the upper unit 120 to detect optical data of the film 2. A negative mask 131 includes an aperture 131a for delimiting an area of the image recording portion of the film 2 to be printed on to a print paper 103.

A magnetic head unit 132 includes a pair of magnetic heads 132a for reading information magnetically recorded at the magnetic recording portions 2b of the film 2. That is, a pair of these magnetic heads 132a are provided in correspondence with the pair of upper and lower magnetic recording portions 2b of the film shown in FIG. 25. A lower cleaning belt 150 and a fan 163 constitute portions of a dust removing apparatus (second cleaning means) for removing dust from a film surface. Details of this apparatus will be given later. The drive motor 128 drives the drive rollers 124, 125, 126 via the belt 129, as described above. In addition, this drive motor 128 drives also the lower cleaning belt 160 via an unillustrated transmission mechanism.

Between the magnetic head unit 132 and the lower cleaning belt 160, there is provided a guide member 135 which includes slanted portions 135a for allowing smooth transportation of the film 2 past the dust removing apparatus 134 to the magnetic head unit 132. Adjacent the lower cleaning belt 160, there is disposed a movable head member 137 constituting portions of a cleaning head 136 (first cleaning means)(see FIG. 26).

Figure 27:
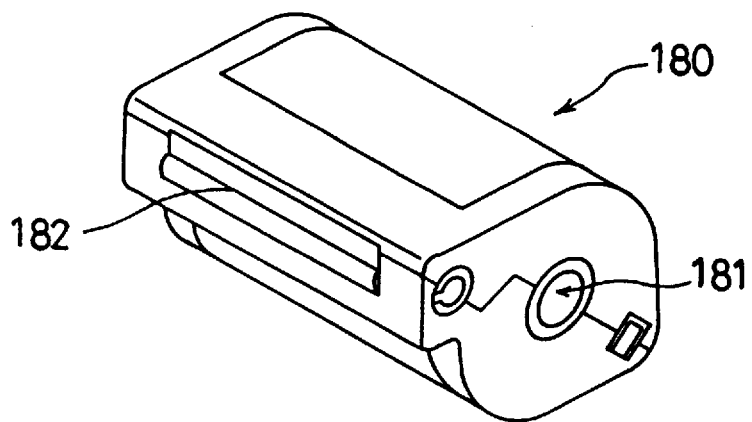
FIG. 27 is an outer appearance view of a film cartridge.

The cartridge holder 140 holds the film cartridge 180 shown in FIG. 27 storing the film 2 therein. The cartridge 180 is supported in the longitudinal direction thereof by being bound between a pair of opposed walls 141. These walls 141 include projections 142 which are to be inserted into opposed holes 181 formed in the cartridge 180, whereby the cartridge 180 is fixed in position. The cartridge holder 140 further includes a lid 143 which is pivotable about a pivot shaft 144. Then, for holding the cartridge 180, the lid 143 is opened, as illustrated in FIG. 23.

The upper unit 120 is shown in details in FIG. 23. The upper unit 120 includes the upper guide 150 provided as an upper recess where the image bearing face of the film 2 is caused to pass. As described hereinbefore, the upper guide 150 in cooperation with the lower guide 127 supports and guides the right and left ends of the film 2. The upper unit 120 further includes press rollers 154, 155, 156 disposed in opposition to the drive rollers 124, 125, 126 when the upper unit 120 and the lower unit 121 are closed to each other. The beam receiving portion 130b of the optical sensor 130 is disposed at the position which comes into opposition to the beam emitting portion 130a of the sensor provided in the lower unit 121 when the units 120, 121 are closed to each other, Further, an upper cleaning belt 161 is provided at a position corresponding to the lower cleaning belt 160. This upper cleaning belt 161 is driven by means of a motor and a transmission mechanism neither of which are shown. The upper unit further includes a stationary head member 138 in opposition to the movable head members 137.

The upper unit 120 and the lower unit 121 having the above-described constructions are closed and connected with each other via engaging portions 145, i.e. a hooked portion 145a provided in the lower unit 121 and a pawl portion 145b provided in the upper unit 120.

Next, with reference to FIG. 26, the construction of the cleaning head 136 and of the other adjacent components will be described in greater details. FIG. 26(a) is a section taken along the transporting direction of the film and FIG. 26(b) is a section taken along the width direction of the film.

The movable head member 137 and the stationary head member 138 are disposed in opposition to each other to bind the face of the film 2 therebetween. The stationary head member 138 is fixed to the upper unit 120. Whereas, the movable head member 137 is biased against the stationary head member 138 by means of a pair of springs 139. The movable head member 137 includes a pair of leading ends 137a projecting into the film transport passage. Each leading end 137a has a substantially arcuate shape. The stationary head member 138 includes a leading end 138a, disposed in opposition to the leading end 137a, a contact portion 138b disposed in opposition to the guide member 135 and a groove portion 138c for guiding the upper cleaning belt 161. The leading end 138a includes a slanted face for facilitating introduction of the film 2. The movable head member 137 and the stationary head member 138 having the above-described constructions are made of stainless steel hardened by a plasma nitriding treatment, so as to obtain improved resistance against friction. Further, the leading ends 137a, 138a are finished by buff polishing so as not to damage the film 2 during its cleaning.

In FIG. 26, on the image and magnetic recording side of the film 2, the stationary head member 138 and the magnetic head 132a of the magnetic head unit 132 are disposed.

Next, the dust removing apparatus 134 will be described with reference to FIG. 28.

Incidentally, in this figure, the other constructions inside the film transport unit 105 are eliminated from the view for the purpose of facilitating the understanding.

Figure 28:
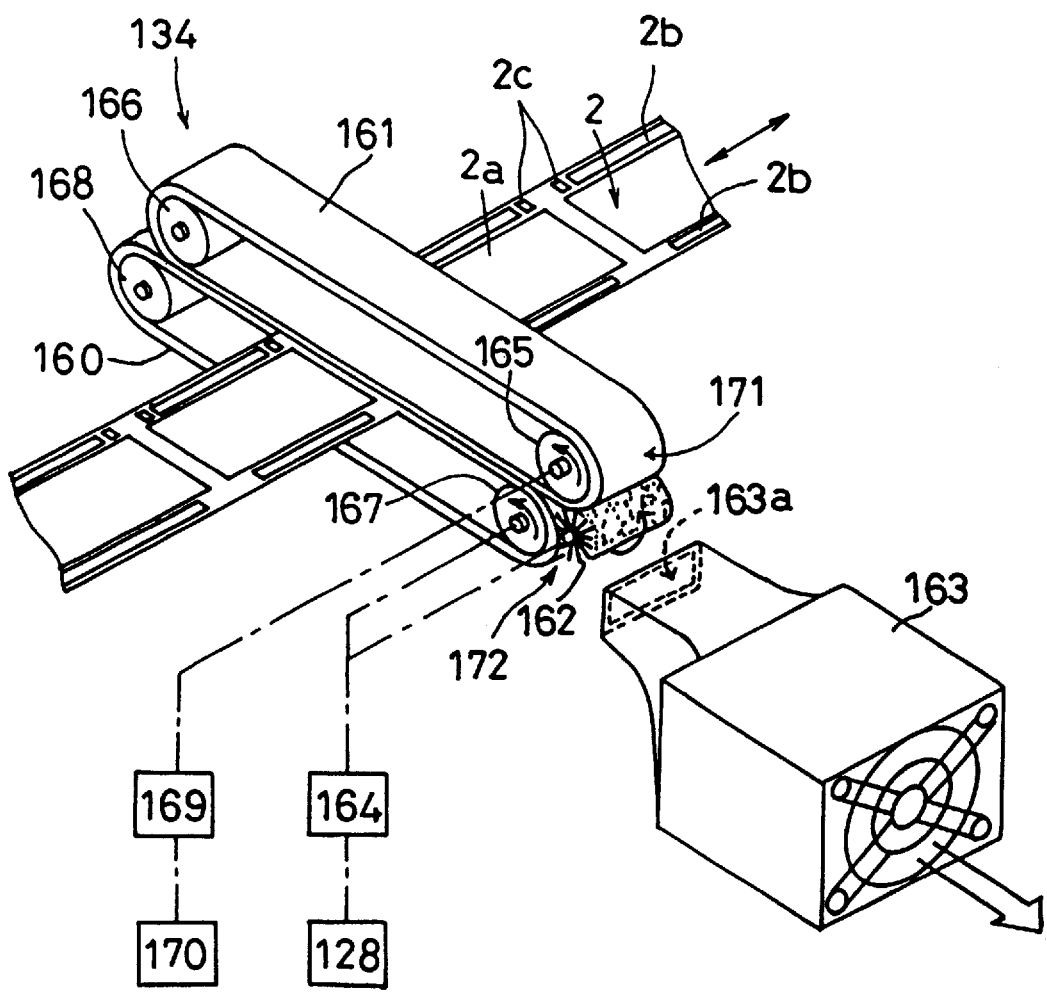
FIG. 28 is a perspective view showing an outer appearance of a dust removing apparatus.

As shown in FIG. 28, the dust removing apparatus 134 includes the upper cleaning belt 161 and the lower cleaning belt 160 as the endless belt type dust removing members disposed one above the other across the film 2, a brush roller 162 for eliminating dust adhered to the upper and lower cleaning belts 160, 161, a fan 163 for sucking the dust attached to the brush roller 162, the drive motors 128, 170 for rotatably driving the upper and lower cleaning belts 128, 170, and transmission units 164, 169. As may be apparent from the above description, the construction of this dust removing apparatus 134 is very similar to that of the sixth embodiment, except for a drive mechanism to be described next.

For driving the upper and lower cleaning belts 160, 161, a following construction is provided. Namely, the upper cleaning belt 162 is driven in the direction of an arrow in FIG. 28 by means of a drive roller 165 and a driven roller 166. The lower cleaning belt is driven in the direction of a further arrow in FIG. 28 by means of a drive roller 167 and a driven roller 168. The drive roller 165 is operatively connected with the drive motor 170 via the transmission unit 169 which includes a reduction mechanism comprised of e.g. gears. Similarly, the drive roller 167 and the brush roller 162 are operatively connected with the drive motor 128 via the transmission unit 164. The brush roller 162 having a substantially cylindrical configuration is disposed in such a manner as to contact both a curved portion 171 of the upper cleaning belt 161 and a curved portion 172 of the lower cleaning belt 160. The brush roller 162 is driven to rotate in the direction of arrow.

An opening 163a of the fan 163 as the suction means is disposed in the vicinity of the outer periphery of the brush roller 162.

The brush roller 162 includes bristles mounted on and about a stainless core shaft.

In operation, the dust collected on the upper and lower cleaning belts 160, 161 is removed by the brush roller 162 and this dust on the brush roller 162 is sucked and eliminated by the fan 163.

Of the above components of the dust removing apparatus 134, the lower cleaning belt 160, drive roller 167, driven roller 168, brush belt 162, fan 163, transmission unit 164 and the drive motor 128 are disposed in the lower unit 121. Further, the upper cleaning belt 161, drive roller 165, driven roller 166, transmission unit 169 and the drive motor 170 are disposed in the upper unit 120.

Next, the functions and operations of the photographic printing apparatus will be described.

By opening the film transport unit 105, the film cartridge 180 is set to the cartridge holder 140. After this setting of the cartridge 180, the film transport unit 105 is closed. Thereafter, in response to a predetermined start signal, the film 2 is withdrawn from the cartridge 180. This withdrawn film 2 is then transported by the motor 128 in the direction of arrow A in FIG. 23 or 24. Also, in synchronism with the withdrawal of the film 2, the upper and lower cleaning belts 160, 161 are driven.

The withdrawn film 2 is first caused to pass the optical sensor 130, during which the sensor reads information optically recorded in the film 2. Next, the film is caused to pass the cleaning head 136, during which dust, especially coagulated developing liquid is eliminated from the film by scraping. Immediately after the passage through the cleaning head 136, the film passes between the upper and lower cleaning belts 160, 161, during which a dust cleaning operation is effected over the entire width of the film 2 so as to remove dust or the like particularly from the image recording portion 2a of the film 2. The removed dust is carried away by the fan 163 to the outside of the film transport unit 106.

After the passage through the upper and lower cleaning belts 160, 161, the magnetic head unit 132 reads the information from the magnetic recording portions 2b. This information reading operation may be effected with high accuracy because the dust, solidified developing liquid or the like has just been removed from the film.

After the magnetically recorded information corresponding to the all of the frames 2a has been read in association with transportation of the film 2 in the direction of arrow A, the film 2 is once transported reversely in the direction of arrow B. Then, the film 2 is again transported in the direction of arrow A to have its frames 2a to be exposed and printed at the exposure unit 200 one after another. In this printing exposure of the film 2, each frame 2a of the film is stopped and fixed in position at the opening 131a. Alternatively, the printing exposure operation may be effected in association with the reverse transportation of the film in the direction of arrow B.

In the above-described construction of FIG. 23, the arrangement is such that the cleaning head 136, dust removing apparatus 134, magnetic head unit 132, and the opening 131a are disposed in this order from the upstream side in the transporting direction A. Other arrangements are also conceivable.

Figure 29:
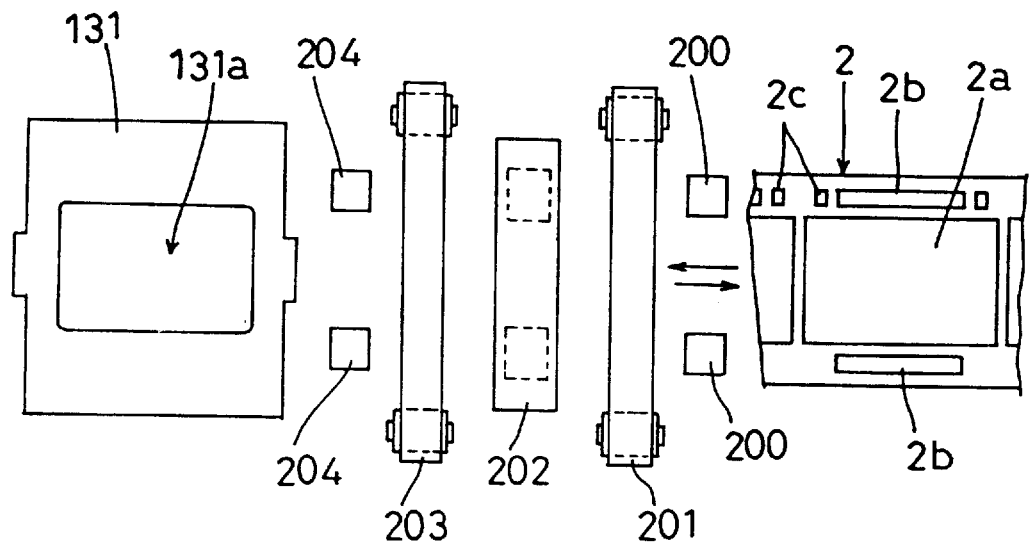
FIG. 29 is a view showing a first alternative arrangement of the cleaning head.

For example, in FIG. 29, the arrangement is in the order of the cleaning head 200, dust removing apparatus 201, magnetic head unit 202, another dust removing apparatus 203, another cleaning head 204 and then the opening 131a. In the case of this arrangement, the reading operation of the magnetic information is possible in either direction of A or B.

Figure 30:
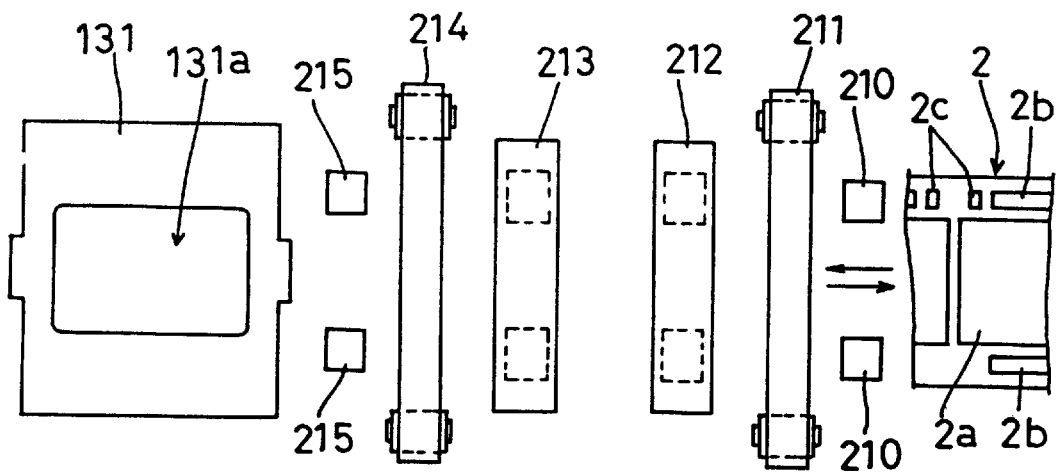
FIG. 30 is a view showing a second alternative arrangement of the cleaning head.

FIG. 30 shows a still further arrangement in the order of a cleaning head 210, dust removing apparatus 211, magnetic writing head unit 212, magnetic reading head unit 213, another dust removing apparatus 214, another cleaning head 215, and then the opening 131*a*. In the case of this arrangement, the writing operation of the magnetic information is possible in the forward transport direction A and the reading operation of the magnetic information is possible in the reverse transport direction B. Further, in the case of this arrangement, the magnetic writing head unit 212 and the magnetic reading head unit 213 may be switched over in the disposing order. Also, an additional dust removing apparatus and/or cleaning head may be interposed between the magnetic writing head unit 212 and the magnetic reading head unit 213.

(other embodiments)

The first and second embodiments employ, as the dust removing members in the form of endless belts, the brush belts 40, 41 having the brush side face contacting the photographic film 2. Instead, the dust removing members may comprise e.g. cloth material in the form of endless belts.

In the first, second and sixth through ninth embodiments, the belts 40, 41, 60, 61 of the dust removing apparatus DR are entrained so as to transverse the transport direction of the photographic film 2 at 90 degrees. Instead, these belts may be disposed at any other angle relative to the transport direction, or may be disposed parallel with the transport direction of the photographic film 2 so as to minimize the width relative to the transport direction of the photographic film 2.

Further, the upper belt 40, 60 and the lower belt 41, 61 may be arranged to cross each other in the plan view.

In the first, second and sixth through ninth embodiments, the upper belt 40, 60 and the lower belt 41, 61 of the dust removing apparatus DR are arranged to contact respectively the front and back surfaces of the photographic film 2 at one location on the transport direction of the photographic film 2. Instead, the upper belt 40, 60 and the lower belt 41, 61 may be arranged to contact the photographic film 2 at different locations on the transport direction of the photographic film 2.

In the first, second and sixth through ninth embodiments, in order to contact the front and back surfaces of the photographic film 2, the two belts, i.e. the upper belt 40, 60, and the lower belt 41, 61 are provided. Instead, a single belt may be provided in such a manner that the belt is entrained in the substantially C-shaped arrangement to be driven to contact the front and back surfaces of the photographic film 2.

In the first and second embodiment, the openings 47*a*, 47*b* of the air duct 3 of the suction means DS of the dust removing apparatus DR are disposed to face the first one of the curved portions B of the brush belts 40, 41 in the order after the contact with the photographic film 2. Instead, the openings may be provided for all the curved portions B or at any other locations than the curved portions S.

The suction means DS may be provided in a plurality or this suction means DS may be eliminated at all.

In the first, second and sixth through ninth embodiments, the brush belts 40, 41, 60, 61 are each entrained about the drive roller 42 and the driven roller 43. Instead, two upper and lower belts each entrained about one roller may be arranged to contact the photographic film 2 from the upper and lower sides thereof.

In the third and fourth embodiments, the cylindrical brush rollers 30, 31 are employed for removing the dust from the photographic film 2. Instead, a cloth member in the form of a belt may be entrained to contact the photographic film 2 and the dust adhered to the cloth member may be eliminated therefrom by the adhesive rollers 32, 33.

Further, a belt-like base member having a brush face may be arranged to be driven to rotate in contact with the photographic film 2.

In the third through fifth and eighth embodiments, the adhesive rollers 32, 33, 70 constitute the dust take-off members DE. Instead, a planar adhesive sheet may be fed serially to come into contact with the dust removing face RS located at the non-removing position.

In the ninth embodiment, the dust removing apparatus employs the endless belts 60, 61. Instead, the construction of this embodiment may be applied to the further constructions of the third through fifth embodiments using the cylindrical dust removing members. Further, in place of the construction in which only the lower belt is movable, both the upper and lower belts may be rendered movable, In the ninth embodiment, the presence/absence of the photographic film 2 is detected by the optical sensor 83. Instead, this may be detected magnetically or mechanically.

In the tenth embodiment, the dust removing apparatus is incorporated within the film transport unit 105. However, the present invention is not limited to such integral unit type construction.

As the magnetic head unit employed in the tenth embodiment, any of the read-only type head unit, write-only type head unit and read-and-write type head unit may be employed in the present invention.

In the tenth embodiment, in the construction of the transporting means disclosed therein, the film 2 is transported by a plurality of drive rollers 124, 125, 126. Instead, the film may be transported by means of a belt also. Further, the output shaft of the drive motor 128 may be connected via a series of gears with the drive rollers 124, 126, 126.

In the tenth embodiment, it is conceivable to provide a slanted face in the stationary head member 138 at a portion thereof coming into contact with the film 2 so as to carry the removed dust away from the film transport passage.

In all the foregoing embodiments, the dust removing apparatuses for photosensitive material are used in combination with an image printer system. Instead, the apparatuses may be used in combination with any other device or system using a photosensitive material such as a film projector. Or, the apparatus may be used as an independent apparatus.

In all the foregoing embodiments, the dust removing apparatuses are used in combination with an image printer system for removing dust from a photographic photographic film film 2. Instead, the apparatuses may be used for removing dust from any other elongate band-like member such as a VTR tape, an audio tape or the like.

The apparatuses may be further used for dust removal of any other object of any configuration other than the band-like configuration.

In all the foregoing embodiments, the dust removing apparatus DR is constructed to remove dust from both the front and back surfaces of the photographic photographic film film 2 as the elongate band-like material. Instead, the apparatus may be modified to remove dust from only one surface of the material.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A photographic processing apparatus for processing a photographic film based on magnetic information recorded in a magnetic recording portion of the film, comprising:

transporting means for transporting the photographic film along a film transport passage in a film transporting direction;

a magnetic head disposed in the film transport passage; and first cleaning means disposed upstream relative to the magnetic head in the film transport passage for cleaning the magnetic recording portion of the film;

wherein the first cleaning means includes a stationary head member and a movable head member which members are disposed across the film surface, with the movable head member being elastically urged against the stationary head member.

2. A photographic processing apparatus according to claim 1, wherein the stationary head member is disposed on the side of the magnetic recording portion of the film.

3. A photographic processing apparatus according to claim 1, further comprising second cleaning means interposed between the magnetic head and the first cleaning means in the film transport passage for cleaning an image recording portion of the film.

4. A photographic processing apparatus according to claim 1, wherein the magnetic head is a magnetic reading head, and the apparatus further comprises a magnetic writing head, the first cleaning means including a pair of cleaning heads spaced apart in said film transport direction, the magnetic writing head and the magnetic reading head being interposed between said pair of cleaning heads.

5. A photographic processing apparatus according to claim 3, wherein the magnetic head is a magnetic reading head, and the apparatus further comprises a magnetic writing head, said second cleaning means including a pair of dust removing apparatus spaced apart in said film transporting direction, the magnetic writing head and the magnetic reading head being interposed between said pair of dust removing apparatus.

6. A photographic processing apparatus according to claim 1, wherein the magnetic head is capable of reading and writing the magnetic information.

7. A photographic processing apparatus according to claim 1, wherein the stationary head member is disposed with a transverse space with respect to the film transporting direction and includes a pair of ends projecting toward the movable head member.

8. A photographic processing apparatus according to claim 7, wherein the stationary head member includes a contact portion disposed with a space with respect to the film transporting direction from the pair of leading ends.

9. A photographic processing apparatus according to claim 8, further comprising second cleaning means interposed between the magnetic head and the first cleaning means in the film transport passage for cleaning an image recording portion of the film, the second cleaning means being disposed between the pair of leading ends and the contact portion of the stationary head member.

10. A photographic processing apparatus according to claim 9, wherein the second cleaning means includes an endless belt, and the stationary head member extends through a loop formed by the endless belt.

11. A photographic processing apparatus according to claim 1 wherein the second cleaning means has a portion that moves laterally with respect to said film transporting direction.

12. A photographic processing apparatus for processing a photographic film based on magnetic information recorded in a magnetic recording portion of the film, comprising:

transporting means for transporting the photographic film along a film transport passage in a film transporting direction;

a magnetic head disposed in the film transport passage;

first cleaning means disposed upstream relative to the magnetic head in the film transport passage for cleaning the magnetic recording portion of the film; and second cleaning means disposed adjacent the first cleaning means for cleaning an image recording portion of the film;

the first cleaning means including a stationary head member and a movable head member which members are disposed across the film surface, with the movable head member being elastically urged against the stationary head member.

13. A photographic processing apparatus according to claim 12 wherein the second cleaning means has a portion that moves laterally with respect to said film transporting direction.

* * * * *

UNITED STATES PATENT AND TRADEMARK OFFICE
CERTIFICATE OF CORRECTION

PATENT NO. : 5,841,516
DATED : November 24, 1998
INVENTOR(S) : Miyawaki et al.

It is certified that error appears in the above-identified patent and that said Letters Patent is hereby corrected as shown below:

In column 1, lines 11, 16, 19, 20, 25, 26, 29, 41, 49 and 66, change "magentic" to --magnetic--.

In column 1, line 51, change "conventinal" to --conventional--.

In column 1, line 67, change " ; " to -- : --.

In column 2, line 1, change "transportxing" to --transporting--.

In column 2, lines 8, 11, and 40, change "magentic" to --magnetic--.

In column 2, line 14, change "file" to --film--.

In column 2, line 37, change "intersposed" to --interposed--.

In column 2, line 55, change "readiog!os!" to --reading and--.

In column 2, line 58, change "wriring" to --writing--.

In column 3, line 10, change "invent ion" to --invention--.

In column 3, line 52, delete the second occurrence of "film".

In column 4, line 13, change "6" to --5--.

UNITED STATES PATENT AND TRADEMARK OFFICE
CERTIFICATE OF CORRECTION

PATENT NO. : 5,841,516
DATED : November 24, 1998
INVENTOR(S) : Miyawaki et al.

Page 2 of 3

It is certified that error appears in the above-identified patent and that said Letters Patent is hereby corrected as shown below:

In column 5, line 14, change "H4" to --M4--.

In column 5, line 41, change "." to --,--.

In column 6, line 4, change "film Z" to --film 2--.

In column 9, line 65, after "33" change "," to --.--.

In column 10, line 51, change "80" to --60--.

In column 11, line 25, change "66" to --65--.

In column 14, line 17, change "150" to --160--.

In column 14, line 55, after "other" change "," to --.--.

In column 15, line 1, change "details" to --detail--.

In column 17, line 53, change "S" to --B--.

In column 18, line 15, change "," to --.--.

In column 18, line 32, change the first occurrence of "126" to --125--.

In column 18, line 43, delete the second occurrence of "photographic".

UNITED STATES PATENT AND TRADEMARK OFFICE
CERTIFICATE OF CORRECTION

PATENT NO. : 5,841,516
DATED : November 24, 1998
INVENTOR(S) : Miyawaki et al.

Page 3 of 3

It is certified that error appears in the above-identified patent and that said Letters Patent is hereby corrected as shown below:

In column 18, line 44, delete the second occurrence of "film".

In column 18, line 52, delete the second occurrence of "photographic".

In column 18, line 53, delete the second occurrence of "film".

Signed and Sealed this

Thirteenth Day of July, 1999

Attest:

Attesting Officer

Q. TODD DICKINSON

Acting Commissioner of Patents and Trademarks